United States Patent
Cui et al.

(10) Patent No.: US 12,375,428 B2
(45) Date of Patent: Jul. 29, 2025

(54) INFORMATION TRANSMISSION METHOD AND RELATED DEVICE THEREOF

(71) Applicants: HUAWEI TECHNOLOGIES CO., LTD., Shenzhen (CN); Tsinghua Shenzhen International Graduate School, Shenzhen (CN)

(72) Inventors: Yong Cui, Beijing (CN); Mowei Wang, Shenzhen (CN); Cong Liang, Beijing (CN); Yashe Liu, Beijing (CN); Ru Liang, Beijing (CN); Yong Jiang, Shenzhen (CN)

(73) Assignees: Huawei Technologies Co., Ltd, Shenzhen (CN); Tsinghua Shenzhen International Graduate School, Shenzhen (CN)

(*) Notice: Subject to any disclaimer, the term of this patent is extended or adjusted under 35 U.S.C. 154(b) by 31 days.

(21) Appl. No.: 18/392,998

(22) Filed: Dec. 21, 2023

(65) Prior Publication Data

US 2024/0163229 A1    May 16, 2024

Related U.S. Application Data

(63) Continuation of application No. PCT/CN2022/101155, filed on Jun. 24, 2022.

(30) Foreign Application Priority Data

Jun. 24, 2021 (CN) .................. 202110707682.X

(51) Int. Cl.
*H04L 49/253* (2022.01)
*H04L 49/112* (2022.01)
*H04Q 11/04* (2006.01)

(52) U.S. Cl.
CPC .......... *H04L 49/254* (2013.01); *H04L 49/112* (2022.05); *H04Q 11/0478* (2013.01)

(58) Field of Classification Search
CPC ..... H04L 49/254; H04L 49/112; H04L 65/00; H04L 67/146; H04L 67/60; H04L 47/125; H04L 47/32; H04L 49/90; H04Q 11/0478
See application file for complete search history.

(56) References Cited

U.S. PATENT DOCUMENTS 6,975,626 B1 * 12/2005 Eberle .................. H04L 47/32
                                                        370/466
7,061,929 B1 *  6/2006 Eberle .................. H04L 47/125
                                                        370/423

(Continued)

OTHER PUBLICATIONS

Perry et al., "Fastpass: A Centralized "Zero-Queue" Datacenter Network," M.I.T. Computer Science & Artificial Intelligence Lab, total 12 pages (Aug. 17, 2014).

*Primary Examiner* — Vinncelas Louis
(74) *Attorney, Agent, or Firm* — Leydig, Voit & Mayer, Ltd.

(57) ABSTRACT

An information transmission method and a related device applied to a cloud service system are provided. The cloud service system includes an arbiter, a first switch, and a first server group. The arbiter is connected to the first server group by using the first switch. The method includes: a first server obtains a first identifier of the first server in the first server group. The first server determines, in a first slot, a first time domain location corresponding to the first identifier. The first time domain location is a time domain location at which the first switch receives a first request to be processed by the arbiter, and different identifiers correspond to different time domain locations in the first slot. The first server sends the first request to the first switch based on the first time domain location.

20 Claims, 11 Drawing Sheets

(56) References Cited

U.S. PATENT DOCUMENTS 7,248,592 B1 * 7/2007 Snider .................. H04L 49/90
370/466
2016/0344641 A1 11/2016 Javidi et al.

* cited by examiner

INFORMATION TRANSMISSION METHOD AND RELATED DEVICE THEREOF

CROSS-REFERENCE TO RELATED APPLICATIONS

This application is a continuation of International Application No. PCT/CN2022/101155, filed on Jun. 24, 2022, which claims priority to Chinese Patent Application No. 202110707682.X, filed on Jun. 24, 2021. The disclosures of the aforementioned applications are hereby incorporated by reference in their entireties.

TECHNICAL FIELD

Embodiments of this present disclosure relate to the field of cloud technologies, and in particular, to an information transmission method and a related device thereof.

BACKGROUND

With rapid development of cloud technologies, a scale of cloud service systems is increasing. FIG. 1 is a schematic diagram of a structure of a cloud service system in a conventional technology. As shown in FIG. 1, the cloud service system has a three-layer architecture. A bottom layer is widely distributed physical servers, a middle layer is a top of rack (TOR) switch, and a top layer is a core switch. Data transmission can be implemented between different servers by using a layer 2 switch. In addition, an arbiter is deployed in the system to manage all servers together.

For any TOR switch, the TOR switch is connected to a plurality of servers. When a server needs to transmit data (for example, the server needs to send the data to another server), the server may first send a request to the arbiter by using the TOR switch. The arbiter may then process the request, and return an obtained response to the server, so that the server implements data transmission based on the response.

However, when a same TOR switch receives requests from different servers at the same time, the requests conflict at the switch. If a buffer for buffering the requests is not disposed in the TOR switch, losses of the requests may be caused, and data transmission between the servers is affected.

SUMMARY

Embodiments of this present disclosure provide an information transmission method and a related device thereof, to effectively avoid a case in which requests collide. This may not cause losses of the requests, and can help improve stability of data transmission between servers.

A first aspect of embodiments of this disclosure provides an information transmission method. The method is applied to a cloud service system. The cloud service system includes an arbiter, a first switch, and a first server group. The arbiter is connected to the first server group by using the first switch. Different servers in the first server group have different identifiers. The method includes:

When a first server needs to send a first request to the arbiter by using the first switch, the first server may first obtain a first identifier of the first server in the first server group. Then, the first server determines, in a first slot, a first time domain location corresponding to the first identifier, where the first time domain location is a time domain location at which the first switch receives the first request.

Finally, the first server sends the first request to the first switch, so that the first switch receives the first request at the first time domain location, and sends the first request to the arbiter.

In addition, if another server in the first server group other than the first server also needs to send a request to the arbiter by using the first switch, the another server may also perform steps similar to those performed by the first server. Because different identifiers in the first server group correspond to different time domain locations in the first slot, the time domain location at which the first switch receives the first request of the first server in the first slot and a time domain location at which the first switch receives the request of the another server in the first slot are different.

For example, a server group 1 connected to a TOR switch 1 includes a server 1 and a server 2, an identifier 1 of the server 1 in the server group 1 (a value of the identifier 1 may be 1), and an identifier 2 of the server 2 in the server group 1 (a value of the identifier 2 may be 2). When both the server 1 and the server 2 need to send requests to the arbiter, the server 1 may obtain the identifier 1 of the server 1 in the server group 1, and the server 2 may obtain the identifier 2 of the server 2 in the server group 1. Because the values of the identifier 1 and the identifier 2 are different, the two identifiers correspond to different time domain locations in a slot 1. The server 1 may enable the TOR switch 1 to receive, in the slot 1, a request 1 at a time domain location corresponding to the identifier 1, and the server 2 may enable the TOR switch 1 to receive, in the slot 1, a request 2 at a time domain location corresponding to the identifier 2. After receiving the request 1 and the request 2, the TOR switch 1 may sequentially forward the request 1 and the request 2 to the arbiter.

It can be learned from the foregoing method that, in the first server group, if both the first server and the another server other than the first server need to send requests to the arbiter by using the first switch, the first server and the another server do not enable the first switch to receive a plurality of requests at a same time domain location in the first slot because identifiers of different servers in the first server group are necessarily different and different identifiers correspond to different time domain locations in the first slot. A case in which the requests collide can be effectively avoided. This may not cause losses of the requests, and can help improve stability of data transmission between the servers.

In a possible implementation, that the first server sends the first request to the switch based on the first time domain location includes: The first server calculates a second time domain location based on the first time domain location and first duration of information transmission between the first server and the first switch; and the first server sends the first request to the first switch at the second time domain location. In the foregoing implementation, because the first time domain location is a time domain location at which the first switch receives information, the time domain location needs to be converted into a time domain location at which the first server sends the information. Specifically, the first server may first obtain the first duration of information transmission between the first server and the first switch, subtract the first duration from the first time domain location to obtain the second time domain location, and send the first request to the first switch at the second time domain location, so that the first switch can receive the first request at the first time domain location.

In a possible implementation, before that the first server obtains a first identifier of the first server in the first server group, the method further includes: The first server receives a second response from the first switch. The second response is obtained by the arbiter by processing a second request, the second request indicates that the first server needs to send first data to the second server, and the second response indicates the first switch to receive the first data in the first slot. That the first server obtains a first identifier of the first server in the first server group includes: The first server obtains the first identifier of the first server in the first server group based on the second response. In the foregoing implementation, before sending the first request, the first server may send the second request to the arbiter by using the first switch, and receive the second response of the arbiter by using the first switch. Because the second response indicates the first switch to receive the first data in the first slot, the first server may determine, based on the second response, to enable the first switch to not only receive the first request in the first slot, but also receive the first data in the first slot. In this case, the first server may obtain the first identifier of the first server in the first server group, to determine, in the first slot, the first time domain location corresponding to the first identifier, that is, the time domain location at which the first switch receives the first request.

In a possible implementation, the cloud service system further includes a second switch and a second server group, the first switch is connected to the second switch, the arbiter is connected to the second server group by using the second switch, and after that the first server receives a second response from the first switch, the method further includes: The first server obtains a second identifier of the second server in the second server group based on the second response. The first server determines, in the first slot, a third time domain location corresponding to the second identifier. The first server calculates a fourth time domain location based on the third time domain location and the first duration. The first server remains silent at the fourth time domain location. In the foregoing implementation, after the first server receives the second response, because the second response indicates the first switch to receive the first data in the first slot, the first server may determine, based on the second response, to enable the first switch to not only receive the first request in the first slot, but also receive the first data in the first slot. In this case, the first server may obtain the second identifier of the second server in the second server group, to determine, in the first slot, the third time domain location corresponding to the second identifier. The time domain location is a reserved time domain location (that is, is used as a time domain location at which a response is subsequently received). Then, the first server subtracts the first duration from the third time domain location to obtain the fourth time domain location, and remains silent at the fourth time domain location (that is, does not send any information).

In a possible implementation, after that the first server receives a second response from the first switch, the method further includes: The first server determines, in the first slot, another time domain location other than the first time domain location and the third time domain location as a fifth time domain location. The first server calculates a sixth time domain location based on the fifth time domain location and the first duration. The first server sends the first data to the first switch at the sixth time domain location. In the foregoing implementation, after determining the first time domain location and the third time domain location in the first slot, the first server may determine the another time domain location in the first slot as the time domain location, that is, the fifth time domain location, used to transmit the first data. Then, the first server subtracts the first duration from the fifth time domain location to obtain the sixth time domain location, and sends the first data to the first switch at the sixth time domain location, so that the first switch can receive the first data at the fifth time domain location.

In a possible implementation, the second response carries a time domain location at which the second response leaves the arbiter, and the method further includes: The first server calculates a clock offset based on a time domain location at which the second response arrives at the first server, the time domain location at which the second response leaves the arbiter, third duration of information transmission between the first server and the arbiter. The first server adjusts a local clock of the first server based on the clock offset, so that the local clock of the first server is synchronized with a local clock of the arbiter. It can be learned that the first server may automatically adjust the local clock of the first server in a process of interacting with the arbiter, so that the local clock of the first server is synchronized with the local clock of the arbiter.

In a possible implementation, if the first identifier and the second identifier are the same, the first time domain location and the third time domain location are a same time domain location.

In a possible implementation, the first identifier is a first number of the first server in the first server group, and the second identifier is a second number of the second server in the second server group.

A second aspect of embodiments of this disclosure provides an information transmission method. The method is applied to a cloud service system. The cloud service system includes an arbiter, a second switch, and a second server group. The arbiter is connected to the second server group by using the second switch. Different servers in the second server group have different identifiers. The method includes:

A second server sends a third request to the arbiter by using the second switch, so that the arbiter processes the third request to obtain a third response. Then, the arbiter obtains, in a second slot, a seventh time domain location corresponding to a second identifier of the second server in the second server group. The seventh time domain location is a time domain location at which the second switch receives the third response. Finally, the arbiter sends the third response to the second switch, so that the second switch receives the third response at the seventh time domain location in the second slot.

In addition, if other servers in the second server group other than the second server also send requests to the arbiter by using the second switch, the arbiter may also process the requests to obtain corresponding responses, and perform the foregoing process. Because different identifiers in the second server group correspond to different time domain locations in the second slot, the time domain location at which the second switch receives, in the second slot, the third response to be received by the second server and a time domain location at which the second switch receives, in the second slot, the response to be received by the another server are different.

For example, a server group 2 connected to a TOR switch 2 includes a server 1 and a server 2, an identifier 1 of the server 1 in the server group 2 (a value of the identifier 1 may be 1), and an identifier 2 of the server 2 in the server group 2 (a value of the identifier 2 may be 2). After the server 1 and the server 2 respectively send a request 3 and a request 4 to the arbiter, the arbiter may separately process the two requests to obtain a response 3 and a response 4.

Then, the arbiter may obtain the identifier 1 of the server 1 in the server group 2, and the identifier 2 of the server 2 in the server group 2. Because the values of the identifier 1 and the identifier 2 are different, the two identifiers correspond to different time domain locations in a slot 2. The arbiter may enable the TOR switch 2 to receive, in the slot 2, a response 3 at a time domain location corresponding to the identifier 1, and enable the TOR switch 2 to receive, in the slot 2, a response 4 at a time domain location corresponding to the identifier 2. After receiving the response 3 and the response 4, the TOR switch 2 may send the response 3 to the server 1, and send the response 4 to the server 2.

It can be learned from the foregoing method that this disclosure provides a new response sending mode. After the arbiter obtains responses to be received by different servers in the second server group, the arbiter may enable the second switch to receive, at different time domain locations in the second slot, the responses that are ready to be sent to different servers in the second server group because identifiers of different servers in the second server group are different and different identifiers correspond to different time domain locations in the second slot.

In a possible implementation, the second slot further includes an eighth time domain location different from the seventh time domain location, the eighth time domain location is a time domain location at which the second switch receives first data, and the first data is data to be sent to the second server. In the foregoing implementation, the arbiter determines the seventh time domain location (corresponding to the second identifier of the second server in the second server group) in the second slot, and enables the second switch to receive the third response at the seventh time domain location. The second slot further includes the eighth time domain location, and the second switch receives the first data (data sent by the first server to the second server) at the eighth time domain location. Because the seventh time domain location and the eighth time domain location are completely different time domain locations, the second switch does not receive the data and the response at a same time domain location in the second slot. A case in which the data collides with the response can be effectively avoided. This may not cause a loss of the response, and can help improve stability of data transmission between the servers.

In a possible implementation, the cloud service system further includes a first switch and a first server group, the first switch is connected to the second switch, and the arbiter is connected to the first server group by using the first switch. The first data is the data that needs to be sent by the first server to the second server, the second slot further includes a ninth time domain location, the ninth time domain location corresponds to a first identifier of the first server in the first server group, and the eighth time domain location is another time domain location in the second slot other than the seventh time domain location and the ninth time domain location. In the foregoing implementation, the arbiter may divide the second slot into three parts, that is, the seventh time domain location, the eighth time domain location, and the ninth time domain location. The seventh time domain location is a time domain location at which the second switch receives the response. The eighth time domain location is a time domain location at which the second switch receives the first data. The ninth time domain location is used as a reserved time domain location.

In a possible implementation, that the arbiter sends the third response to the second switch based on the seventh time domain location includes: The arbiter calculates a tenth time domain location based on the seventh time domain location and second duration of information transmission between the arbiter and the second switch. The arbiter sends the third response to the second switch at the tenth time domain location. In the foregoing implementation, because the seventh time domain location is a time domain location at which the second switch receives information, the time domain location needs to be converted into a time domain location at which the arbiter sends the information. Therefore, the arbiter may subtract the second duration from the seventh time domain location to obtain the tenth time domain location, and send the third response to the second switch at the tenth time domain location, so that the second switch receives the third response at the seventh time domain location in the second slot.

In a possible implementation, before that the arbiter obtains, in a second slot, a seventh time domain location corresponding to a second identifier of the second server in the second server group, the method further includes: The arbiter calculates, based on the time domain location at which the third response is obtained and the second duration, the second slot in which the time domain location at which the third response arrives at the second switch is located. In the foregoing implementation, the arbiter may obtain the second duration of information transmission between the arbiter and the second switch, add the second duration to the time domain location at which the third response is obtained, and estimate the time domain location at which the third response arrives at the second switch. Then, the arbiter may detect a slot in which the time domain location at which the third response arrives at the second switch is located. If the time domain location is in the second slot, the arbiter may determine the seventh time domain location in the second slot as the time domain location at which the second switch receives the third response.

In a possible implementation, the method further includes: If the second server does not receive the first data, in other words, the second switch does not send the first data to the second server, that is, the second switch does not receive the first data at the seventh time domain location in the second slot, it indicates that a transmission path between the first switch and the second switch is faulty. In this case, the second server may send a fourth request (indicating that the second server does not receive the first data) to the arbiter by using the second switch in a subsequent process, so that the arbiter determines, based on the fourth request, that the transmission path between the first switch and the second switch is faulty, and performs subsequent path fault troubleshooting (for example, disables the path until the fault is cleared).

In a possible implementation, the method further includes: If the arbiter does not receive, within preset duration (that is, within a preset time period), a request generated by the second server, the arbiter may directly determine that the transmission path between the second server and the arbiter is faulty, and perform subsequent path fault troubleshooting.

In a possible implementation, if the first identifier and the second identifier are the same, the seventh time domain location and the tenth time domain location are a same time domain location.

In a possible implementation, the first identifier is a first number of the first server in the first server group, and the second identifier is a second number of the second server in the second server group.

A third aspect of embodiments of this disclosure provides a server. The server is used as a first server, and the first server is disposed in a cloud service system. The cloud service system includes an arbiter, a first switch, and a first server group. The arbiter is connected to the first server group by using the first switch. Different servers in the first server group have different identifiers. The first server includes: a processing module, configured to obtain a first identifier of the first server in the first server group, where the processing module is further configured to determine, in a first slot, a first time domain location corresponding to the first identifier, the first time domain location is a time domain location at which the first switch receives a first request to be processed by the arbiter, and different identifiers correspond to different time domain locations in the first slot; and a sending module, configured to send the first request to the first switch based on the first time domain location.

It can be learned from the foregoing first server that, in the first server group, if both the first server and another server other than the first server need to send requests to the arbiter by using the first switch, the first server and the another server do not enable the first switch to receive a plurality of requests at a same time domain location in the first slot because identifiers of different servers in the first server group are necessarily different and different identifiers correspond to different time domain locations in the first slot. A case in which the requests collide can be effectively avoided. This may not cause losses of the requests, and can help improve stability of data transmission between the servers.

In a possible implementation, the processing module is configured to calculate a second time domain location based on the first time domain location and first duration of information transmission between the first server and the first switch. The sending module is configured to send the first request to the first switch at the second time domain location.

In a possible implementation, the first server further includes a receiving module, configured to receive receives a second response from the first switch. The second response is obtained by the arbiter by processing a second request, the second request indicates that the first server needs to send first data to the second server, and the second response indicates the first switch to receive the first data in the first slot. The processing module is configured to obtain the first identifier of the first server in the first server group based on the second response.

In a possible implementation, the cloud service system further includes a second switch and a second server group, and the first switch is connected to the second switch. The processing module is further configured to: obtain a second identifier of the second server in the second server group based on the second response, determine, in the first slot, a third time domain location corresponding to the second identifier, and calculate a fourth time domain location based on the third time domain location and the first duration. The sending module is further configured to remain silent at the fourth time domain location.

In a possible implementation, the processing module is further configured to: determine, in the first slot, another time domain location other than the first time domain location and the third time domain location as a fifth time domain location, and calculate a sixth time domain location based on the fifth time domain location and the first duration. The sending module is further configured to send the first data to the first switch at the sixth time domain location.

In a possible implementation, if the first identifier and the second identifier are the same, the first time domain location and the third time domain location are a same time domain location.

In a possible implementation, the first identifier is a first number of the first server in the first server group, and the second identifier is a second number of the second server in the second server group.

A fourth aspect of embodiments of this disclosure provides an arbiter. The arbiter is disposed in a cloud service system. The cloud service system further includes a second switch and a second server group. The arbiter is connected to the second server group by using the second switch. Different servers in the second server group have different identifiers. The arbiter includes: a receiving module, configured to receive a third request from the second switch, where the third request is generated by a second server; a processing module, configured to process the third request to obtain a third response, where the processing module is further configured to obtain, in a second slot, a seventh time domain location corresponding to a second identifier of the second server in the second server group, the seventh time domain location is a time domain location at which the second switch receives the third response, and different identifiers correspond to different time domain locations in the second slot; and a sending module, configured to send the third response to the second switch based on the seventh time domain location.

It can be learned from the foregoing arbiter that this disclosure provides a new response sending mode. After the arbiter obtains responses to be received by different servers in the second server group, the arbiter may enable the second switch to receive, at different time domain locations in the second slot, the responses that are ready to be sent to different servers in the second server group because identifiers of different servers in the second server group are different and different identifiers correspond to different time domain locations in the second slot.

In a possible implementation, the second slot further includes an eighth time domain location different from the seventh time domain location, the eighth time domain location is a time domain location at which the second switch receives first data, and the first data is data to be sent to the second server.

In a possible implementation, the cloud service system further includes a first switch and a first server group, the first switch is connected to the second switch, and the arbiter is connected to the first server group by using the first switch. The first data is data that needs to be sent by the first server to the second server, the second slot further includes a ninth time domain location, the ninth time domain location corresponds to a first identifier of the first server in the first server group, and the eighth time domain location is another time domain location in the second slot other than the seventh time domain location and the ninth time domain location.

In a possible implementation, the processing module is configured to calculate a tenth time domain location based on the seventh time domain location and second duration of information transmission between the arbiter and the second switch. The sending module is configured to send the third response to the second switch at the tenth time domain location.

In a possible implementation, the processing module is further configured to calculate, based on the time domain location at which the third response is obtained and the second duration, the second slot in which the time domain location at which the third response arrives at the second switch is located.

In a possible implementation, if the first identifier and the second identifier are the same, the seventh time domain location and the tenth time domain location are a same time domain location.

In a possible implementation, the first identifier is a first number of the first server in the first server group, and the second identifier is a second number of the second server in the second server group.

A fifth aspect of embodiments of this disclosure provides a server. The server is used as a first server, and the first server includes a memory and a processor. The memory stores code, the processor is configured to execute the code, and when the code is executed, the first server performs the method according to any one of the first aspect or the possible implementations of the first aspect.

A sixth aspect of embodiments of this disclosure provides an arbiter. The arbiter includes a memory and a processor. The memory stores code, the processor is configured to execute the code, and when the code is executed, the arbiter performs the method according to any one of the second aspect or the possible implementations of the second aspect.

A seventh aspect of embodiments of this disclosure provides a cloud service system. The system includes a first server group, a second server group, a first switch, a second switch, and the arbiter according to the sixth aspect. The first server group includes the first server according to the fifth aspect. The arbiter is connected to the first server group by using the first switch, the arbiter is connected to the second server group by using the second switch, and the first switch is connected to the second switch.

An eighth aspect of embodiments of this disclosure provides a computer storage medium. The computer storage medium stores one or more instructions. When the instructions are executed by one or more computers, the one or more computers are enabled to implement the method according any one of the first aspect or the possible implementations of the first aspect, or the method according to any one of the second aspect or the possible implementations of the second aspect.

A ninth aspect of embodiments of this disclosure provides a computer program product. The computer program product stores instructions. When the instructions are executed by a computer, the computer is enabled to implement the method according any one of the first aspect or the possible implementations of the first aspect, or the method according to any one of the second aspect or the possible implementations of the second aspect.

In embodiments of this disclosure, the cloud service system includes the arbiter, the first switch, and the first server group. The arbiter is connected to the first server group by using the first switch. Different servers in the first server group have different identifiers. When the first server needs to send the first request to the arbiter by using the first switch, the first server may first obtain the first identifier of the first server in the first server group. Then, the first server determines, in the first slot, the first time domain location corresponding to the first identifier, where the first time domain location is the time domain location at which the first switch receives the first request. Finally, the first server sends the first request to the first switch, so that the first switch receives the first request at the first time domain location, and sends the first request to the arbiter. In the foregoing process, in the first server group, if the another server other than the first server also needs to send the request to the arbiter by using the first switch, the first server and the another server do not enable the first switch to receive the plurality of requests at the same time domain location in the first slot because identifiers of different servers in the first server group are necessarily different and different identifiers correspond to different time domain locations in the first slot. The case in which the requests collide can be effectively avoided. This may not cause the losses of the requests, and can help improve the stability of the data transmission between the servers.

DESCRIPTION OF EMBODIMENTS

Embodiments of this disclosure provide an information transmission method and a related device thereof, to effectively avoid a case in which requests collide. This may not cause losses of the requests, and can help improve stability of data transmission between servers.

In the specification, claims, and the accompanying drawings of this disclosure, the terms "first", "second", and the like are intended to distinguish between similar objects but do not necessarily indicate a specific order or sequence. It should be understood that the terms used in such a way are interchangeable in proper circumstances, and this is merely a distinguishing manner used when objects that have a same attribute are described in embodiments of this disclosure. In addition, the terms "include", "have" and any other variants mean to cover a non-exclusive inclusion, so that a process, method, system, product, or device that includes a series of units is not necessarily limited to those units, but may include another unit not clearly listed or inherent to such a process, method, product, or device.

Figure 1:
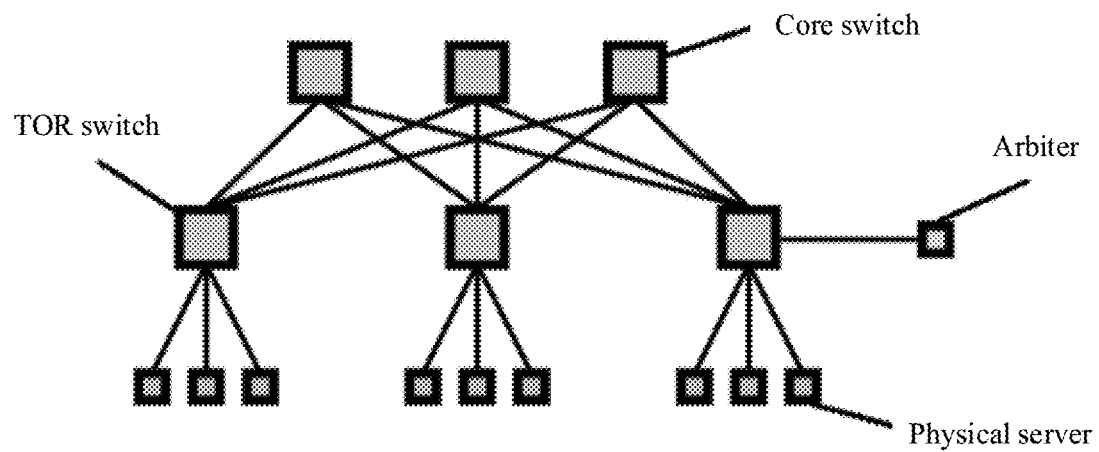
FIG. 1 is a schematic diagram of a structure of a cloud service system in a conventional technology.

With rapid development of cloud technologies, a scale of cloud service systems is increasing. As shown in FIG. 1, the cloud service system has a three-layer architecture. A bottom layer is widely distributed physical servers, a middle layer is a top of rack (TOR) switch, and a top layer is a core switch. Data transmission can be implemented between different servers by using a layer 2 switch. In addition, an arbiter is deployed in the system to manage all servers together.

For any TOR switch, the TOR switch is connected to a plurality of servers. When a server connected to the TOR switch needs to transmit data (for example, the server needs to send the data to a server connected to another switch), the server may first send a request to the arbiter by using the TOR switch. The arbiter may then process the request, and return an obtained response to the server by using the TOR switch, so that the server implements data transmission based on the response.

Figure 2:
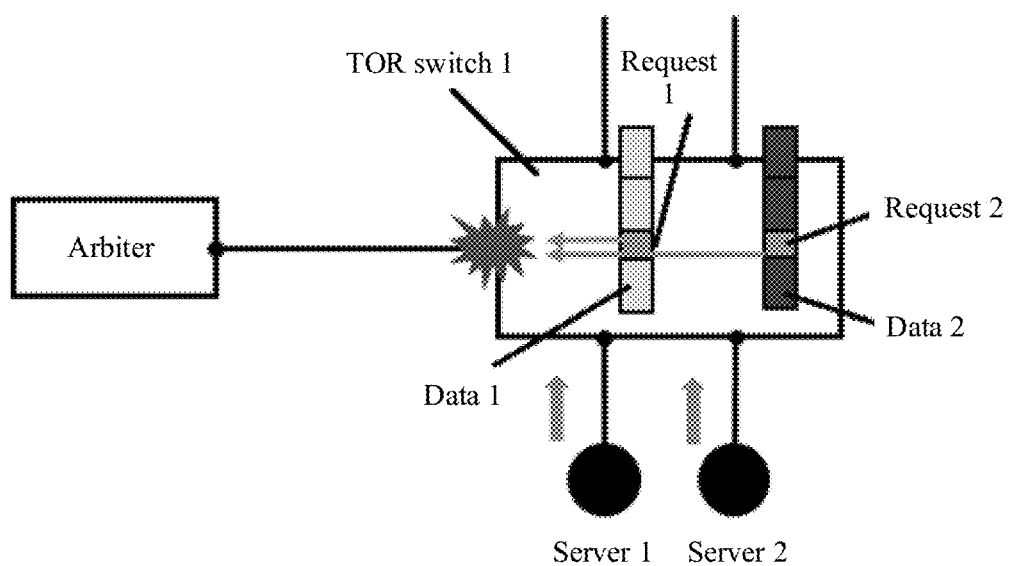
FIG. 2 is a schematic diagram of another structure of a cloud service system in a conventional technology.

However, when a same TOR switch receives requests from different servers at specific time, the requests conflict at the switch. If a buffer is not disposed in the TOR switch (it may also be understood that the TOR switch is a zero-buffer switch), losses of the requests may be caused, and data transmission between the servers is affected. The following further describes the foregoing process with reference to FIG. 2. FIG. 2 is a schematic diagram of another structure of a cloud service system in a conventional technology. As shown in FIG. 2, a TOR switch 1 is connected to a server 1 and a server 2. When the server 1 has a new data transmission requirement, the server 1 may send a request 1 to the TOR switch 1 (it is assumed that the server 1 is sending, by using the TOR switch 1, data 1 to a server 3 connected to a TOR switch 2). Similarly, when the server 2 also has a new data transmission requirement, the server 2 may send a request 2 to the TOR switch 1 (it is assumed that the server 2 is sending, by using the TOR switch 1, data 2 to a server 4 connected to the TOR switch 2). It is assumed that the TOR switch 1 receives the request 1 and the request 2 at a same time domain location (that is, the TOR switch 1 starts receiving of the request 1 and the request 2 at the same time, and completes receiving of the request 1 and the request 2 at the same time). This is equivalent to that the request 1 and the request 2 collide at the TOR switch 1. Because no buffer is disposed in the TOR switch 1, only one request can be selected and forwarded to the arbiter, resulting in a loss of the other request.

Figure 3:
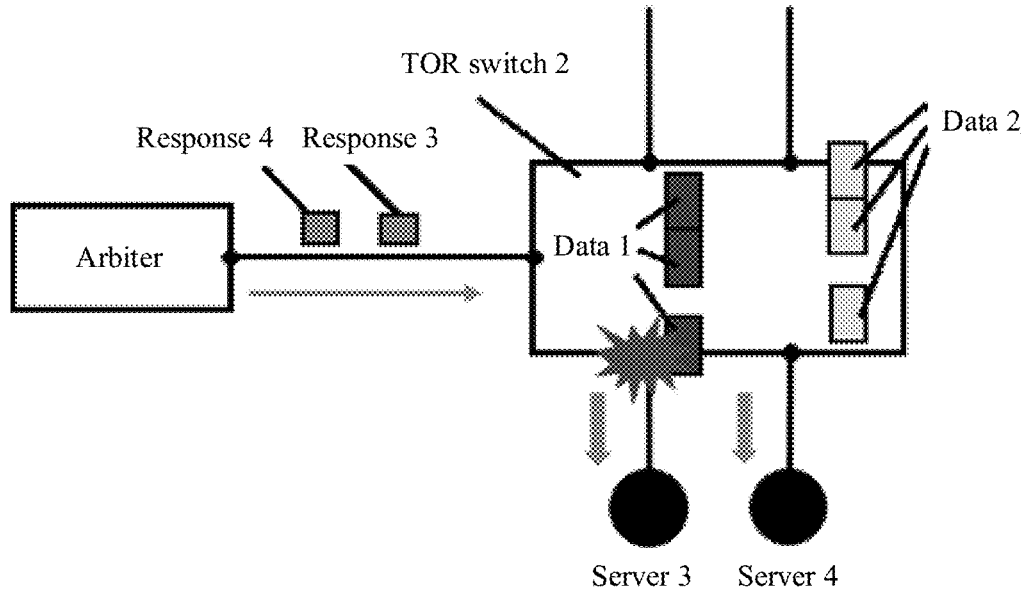
FIG. 3 is a schematic diagram of another structure of a cloud service system in a conventional technology.

Further, when a TOR switch receives a response from the arbiter for a server, if the TOR switch is sending data to the server at this time, the response and the data conflict at the switch. Because no buffer is disposed in the TOR switch, a loss of the response or the data may be caused, and data transmission between servers is affected. The following further describes the foregoing process with reference to FIG. 3. FIG. 3 is a schematic diagram of another structure of a cloud service system in a conventional technology. As shown in FIG. 3, after obtaining a response 3 for the server 3, the arbiter may first send the response 3 to the TOR switch 2. It is assumed that the TOR switch 2 receives the response 3 from the arbiter and the data 1 from the TOR switch 1 at a same time domain location. This is equivalent to that the response 3 and the data 1 collide at the TOR switch 2. Because no buffer is disposed in the TOR switch 2, only the data 1 can be selected and forwarded to the arbiter, resulting in a loss of the response 3.

To resolve the foregoing problem, an embodiment of this disclosure provides an information transmission method.

Figure 4:
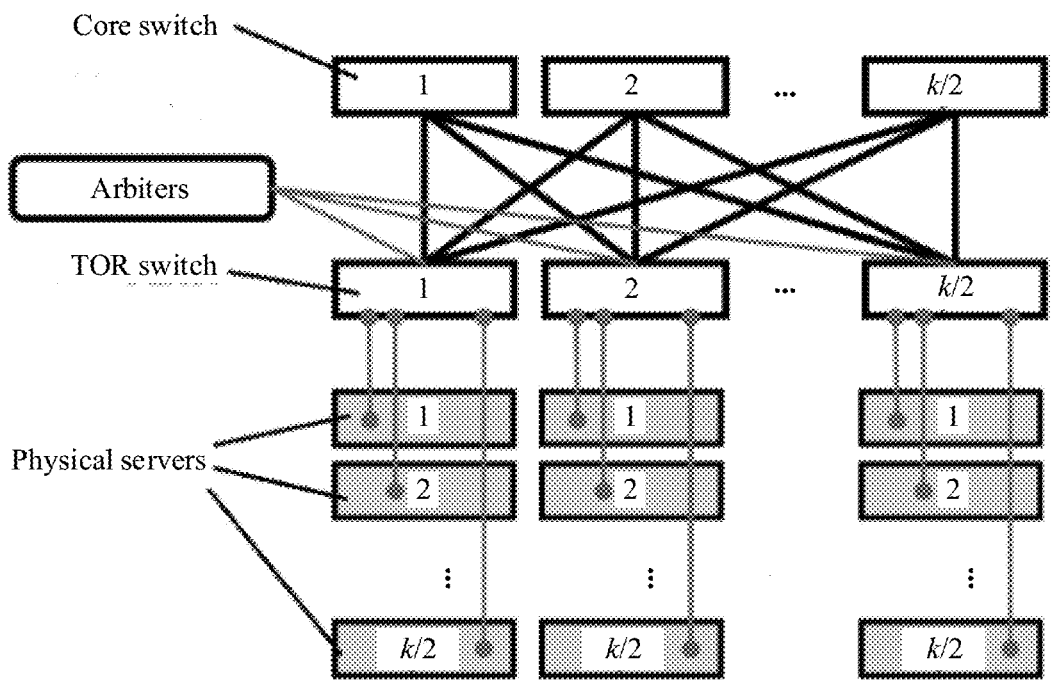
FIG. 4 is a schematic diagram of a structure of a cloud service system according to an embodiment of this present disclosure.

The method may be applied to a cloud service system shown in FIG. 4. (FIG. 4 is a schematic diagram of a structure of a cloud service system according to an embodiment of this disclosure). The following describes the cloud service system first. As shown in FIG. 4, the cloud service system includes an arbiter, a plurality of core switches, a plurality of TOR switches, and a plurality of physical servers.

For any TOR switch, the TOR switch is connected to a server group, and the server group usually includes a plurality of physical servers. The physical server may provide a cloud service for a user in a plurality of manners. For example, a plurality of virtual instances such as a virtual machine (VM) and a container (docker) may be deployed on the physical server. These virtual instances may be assigned to the user to provide the cloud service for the user. For another example, the physical server may alternatively directly provide a cloud service for a user as a bare metal server (that is, the physical server itself).

It should be noted that for any server group, any server in the server group has a unique identifier (for example, a number) in the server group. As shown in FIG. 4, k/2 TOR switches are disposed in the cloud service system, and each TOR switch may be connected to k/2 servers. A TOR switch 1 is connected to a server group 1. The server group 1 includes a server 1, a server 2, . . . , and a server k/2. A number of the server 1 in the server group 1 is 1, a number of the server 2 in the server group 1 is 2, a number of the server k/2 in server group 1 is k/2, and the like. Similarly, a TOR switch 2 is connected to a server group 2. The server group 2 also includes a server 1, a server 2, . . . , and a server k/2. A number of the server 1 in the server group 2 is 1, a number of the server 2 in the server group 2 is 2, a number of the server k/2 in server group 2 is k/2, and the like. The rest may be deduced by analogy. The same rule applies to another server group. Details are not described herein.

The arbiter is a center for managing the entire cloud service system. The arbiter may be a physical server, an offload card, a heterogeneous card, or the like. The offload card may be presented in a form such as a field programmable gate array (FPGA) or an application-specific integrated circuit (ASIC). The heterogeneous card may be presented in a form such as a graphics processing unit (GPU) or a network interface controller (NIC). The arbiter is connected to each TOR switch. Therefore, for any TOR switch, the arbiter may implement, by using the TOR switch, communication with a server group connected to the TOR switch. In this way, the arbiter may manage all servers. As shown in FIG. 4, when the server 1 connected to the TOR switch 1 needs to send data to the server 2 connected to the TOR switch 2, the server 1 may send a request to the arbiter by using the TOR switch 1. Then, the arbiter processes the request of the server 1, and delivers a response (including information such as a slot and a path for data transmission) to the server 1 by using the TOR switch 1, so that the server 1 sends, based on the response, the data to the server 2 connected to the TOR switch 2.

Further, the TOR switches may be connected by using the core switches. In this way, servers in different groups may sequentially implement data transmission by using the TOR switches and the core switches.

Figure 5A:
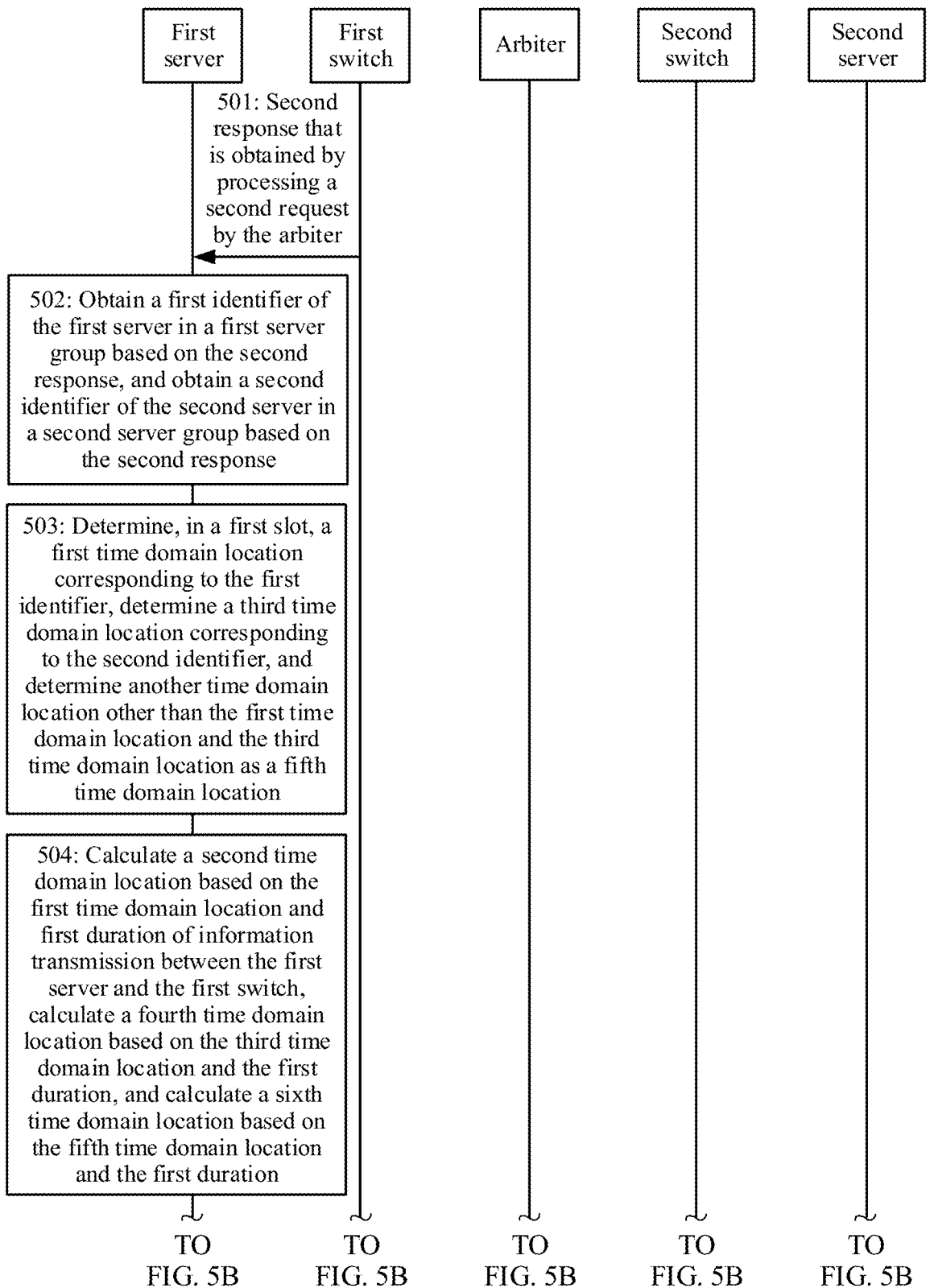
FIG. 5A to FIG. 5C are a schematic diagram of an information transmission method according to an embodiment of this present disclosure.
Figure 5B:
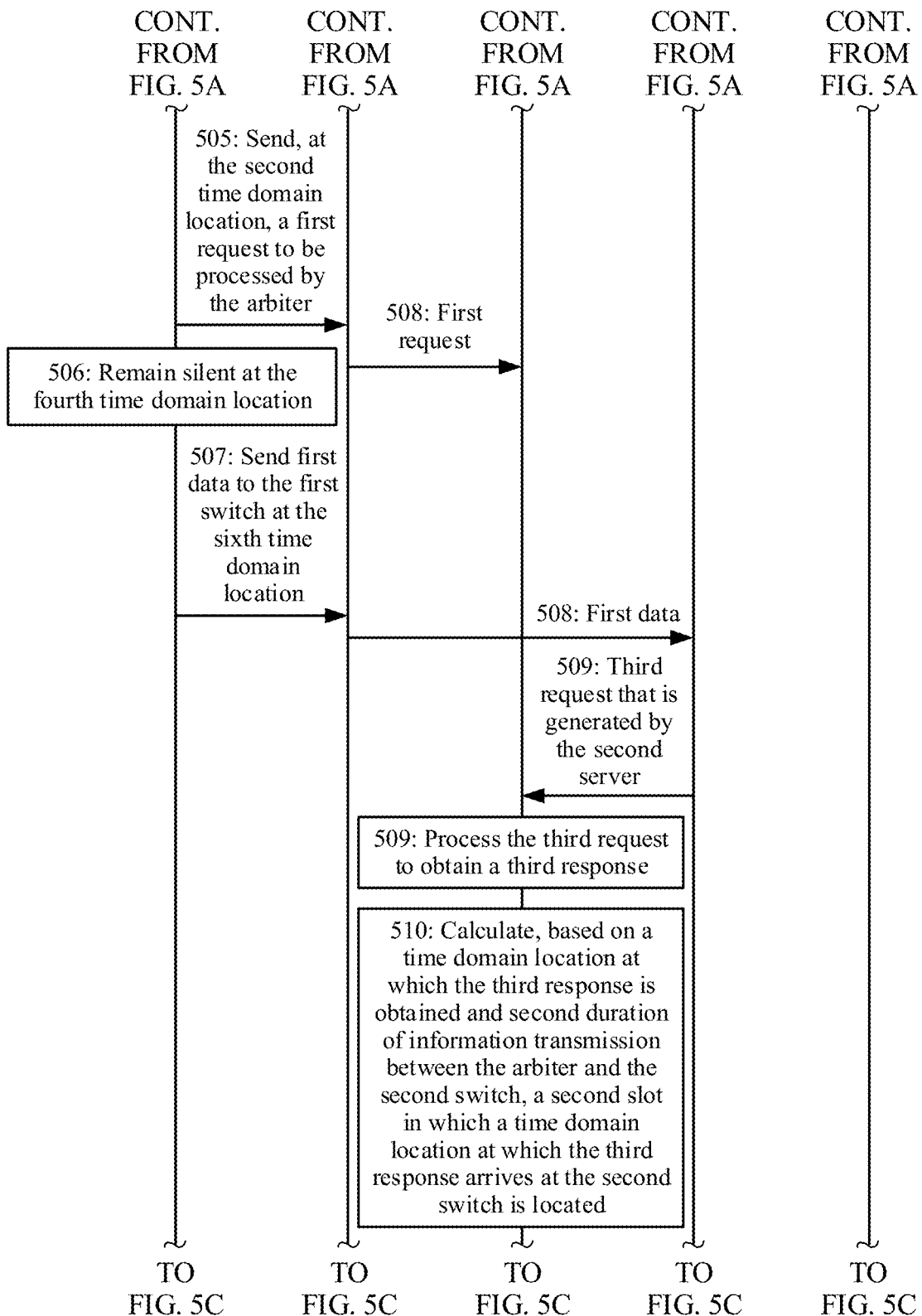
Figure 5C:
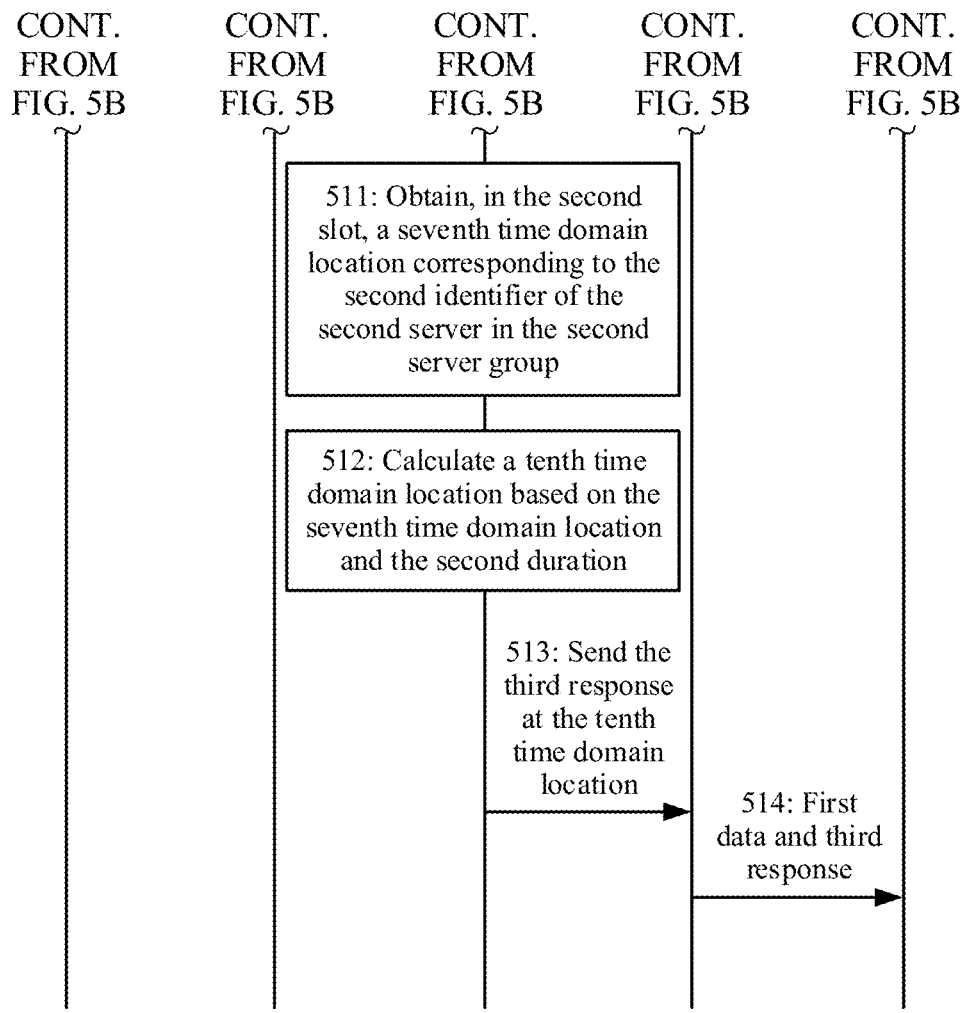

To further understand the foregoing data transmission process, the process is further described below with reference to FIG. 5A to FIG. 5C. FIG. 5A to FIG. 5C are a schematic diagram of an information transmission method according to an embodiment of this disclosure. The method may be applied to the cloud service system shown in FIG. 4. As shown in FIG. 5A to FIG. 5C, the method includes the following steps.

501: A first server receives a second response from a first switch, where the second response is obtained by processing a second request by an arbiter.

In this embodiment, a server used as a data transmitting end in the cloud service system is referred to as the first server, and a server used as a data receiving end is referred to as a second server. Specifically, the first server is a server, in a first server group, connected to the first switch, and the second server is a server, in a second server group, connected to a second switch.

Because the first server irregularly generates a data transmission requirement, the first server may continuously send a request to an arbiter by using the first switch, to receive a response from the arbiter by using the first switch, thereby implementing data transmission. Specifically, the first server may send the request to the arbiter based on a specific rule. The rule may be: The first server enables the first switch to receive the request of the first server in each slot, and forwards the request to the arbiter.

Figure 6:
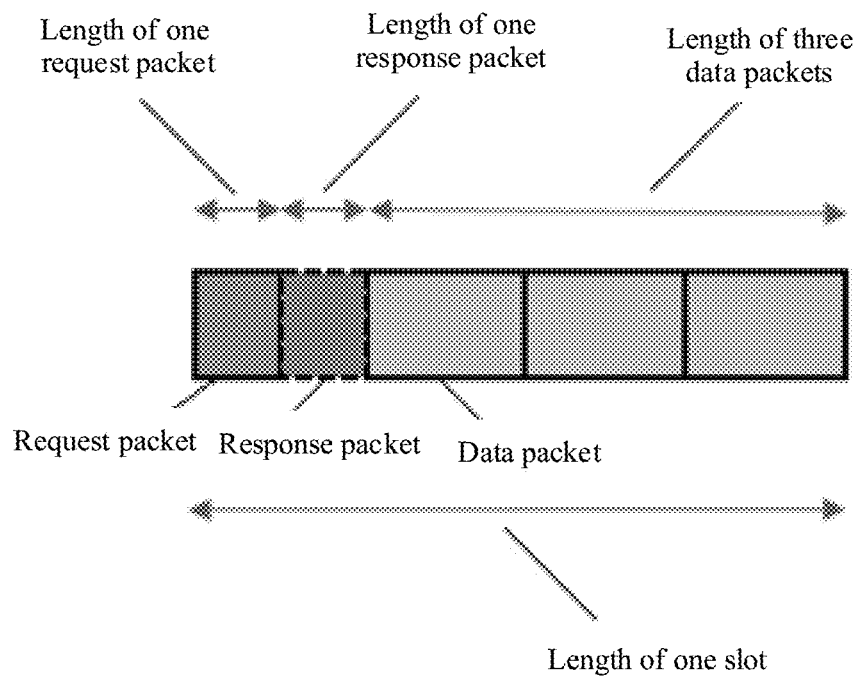
FIG. 6 is a schematic diagram of a slot according to an embodiment of this present disclosure.

It should be noted that a time axis of the entire cloud service system may be divided into a plurality of consecutive slots. Each slot may be considered as a time domain location (that is, a time period) on the time axis, and has a start point and an end point. A length of the slot is usually related to a quantity of servers in a server group. Because in the cloud service system, each server group includes $k/2$ servers, a length of one slot is greater than or equal to a sum of a length of $k/2-1$ data packets (which may be understood as a length of time domain locations that need to be occupied for transmitting the $k/2-1$ data packets), a length of one request packet, and a length of one response packet. To further understand the slot, the following further describes the slot with reference to a specific application example. As shown in FIG. 6 (FIG. 6 is a schematic diagram of a slot according to an embodiment of this disclosure), it is assumed that each server group includes four servers. Therefore, a length of one slot is a sum of a length of three data packets, a length of one request packet, and a length of one response packet.

Figure 7:
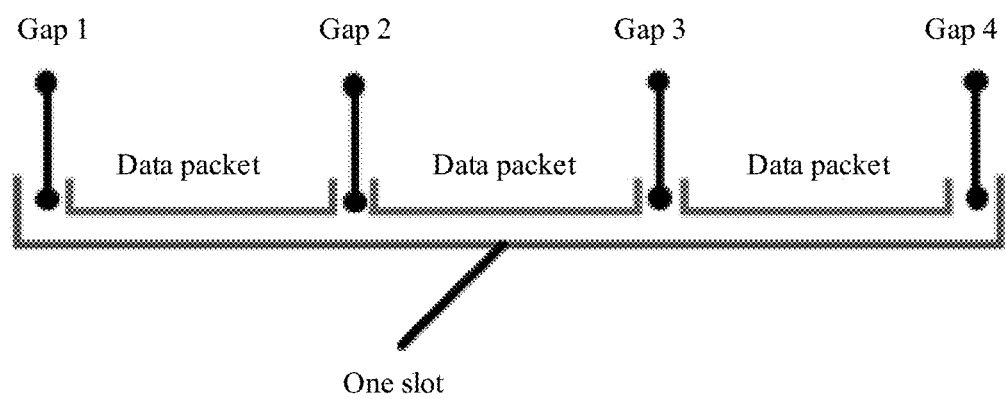
FIG. 7 is a schematic diagram of another slot according to an embodiment of this present disclosure.

It can be learned that one slot may be divided into three parts. A first part is time domain locations used to transmit data, a second part is a time domain location used to transmit a request, and a third part is a time domain location used to transmit a response. Distribution of the three parts of time domain locations in the slot may be determined by an identifier of a server in a server group (for ease of description, subsequently referred to as an intra-group identifier of the server). Still as the above example, as shown in FIG. 7 (FIG. 7 is another schematic diagram of a slot according to an embodiment of this disclosure), in one slot, a length of the time domain locations used to transmit the data is the length of three data packets. Therefore, this part of time domain locations may be evenly divided into three segments, and there are four gaps between the three segments of time domain locations, that is, a gap 1, a gap 2, a gap 3, and a gap 4 in FIG. 7. In this case, the time domain location used to transmit the request and the time domain location used to transmit the response may be inserted in the four gaps.

Because there are $k/2$ gaps in one slot, if a server needs to send data to another server, the server that sends the data may enable a switch connected to the server to receive a request of the server in a slot. A sequence number of a gap in which the time domain location, in the slot, used to transmit the request is inserted is related to an intra-group identifier of the server that sends the data. For example, the sequence number of the gap in which the time domain location, in the slot, used to transmit the request is inserted is a number, or the like of the server that sends the data. Correspondingly, a sequence number of a gap in which the time domain location, in the slot, used to transmit the response is inserted is related to an intra-group identifier of the server that receives the data. For example, the sequence number of the gap in which the time domain location, in the slot, used to transmit the response is inserted is a number, or the like of the server that receives the data. In this case, as the intra-group identifier of the server changes, the two parts of time domain locations may be inserted in gaps in a plurality of manners, which are separately described in the following.

Figure 8:
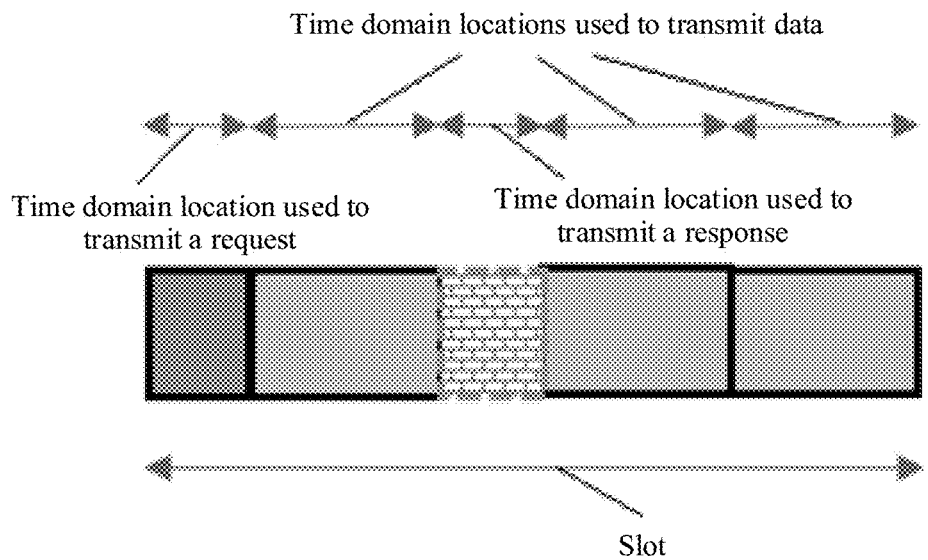
FIG. 8 is a schematic diagram of another slot according to an embodiment of this present disclosure.

As shown in FIG. 8 (FIG. 8 is another schematic diagram of a slot according to an embodiment of this disclosure), it is assumed that when a server 1 connected to a TOR switch 1 needs to send data to a server 2 connected to a TOR switch 2, the server 1 may send a request to the TOR switch 1, and the TOR switch 1 receives the request in a slot 1. In this case, because a number of the server 1 is 1 and a number of the server 2 is 2, the server 1 may insert, in a gap 1 of the slot 1, the time domain location used to transmit the request, and insert, in a gap 2 of the slot 1, the time domain location used to transmit the response. Other time domain locations of the slot 1 are used to transmit the data. In this way, the server 1 may determine, in the slot 1, the time domain location used to transmit the request, the time domain location used to transmit the response, and the time domain locations used to transmit the data.

Figure 9:
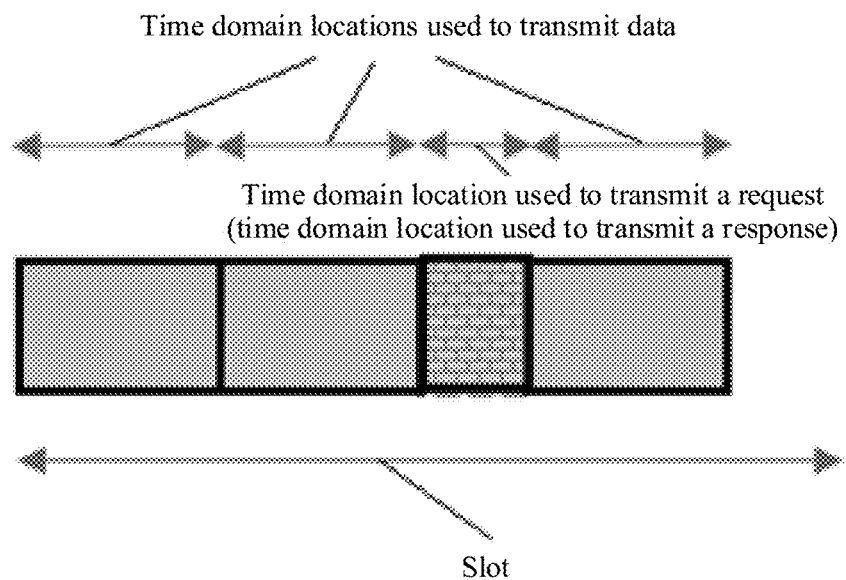
FIG. 9 is a schematic diagram of another slot according to an embodiment of this present disclosure.

As shown in FIG. 9 (FIG. 9 is another schematic diagram of a slot according to an embodiment of this disclosure), it is assumed that when a server 1 connected to a TOR switch 1 needs to send data to a server 1 connected to a TOR switch 2, the server 1 connected to the TOR switch 1 may send a request to the TOR switch 1, and the TOR switch 1 receives the request in a slot 1. In this case, because a number of the server 1 connected to the TOR switch 1 is 1 and a number of the server 1 connected to the TOR switch 2 is also 1, the server 1 connected to the TOR switch 1 may insert, in a gap 1 of the slot 1, the time domain location used to transmit the request, and insert, in the gap 1 of the slot 1, the time domain location used to transmit the response. In this case, the time domain location used to transmit the request and the time domain location used to transmit the response are completely the same. Other time domain locations of the slot 1 are used to transmit the data. In this way, the server 1 may determine, in the slot 1, the time domain location used to transmit the request, the time domain location used to transmit the response, and the time domain locations used to transmit the data.

It can be learned from the examples shown in FIG. 8 and FIG. 9 that, in a same slot, different intra-group identifiers correspond to different gaps, which is equivalent to corresponding to different time domain locations. Same intra-group identifiers correspond to a same gap, which is equivalent to corresponding to a same time domain location.

For ease of description, the following uses the first switch as a reference point, and that the first switch receives the request of the first server in one slot is considered as one round. Because the first server may enable the first switch to receive the request of the first server in each slot, it can be learned that the foregoing process occurs cyclically, that is, there are a plurality of rounds. A first round and another round other than the first round are separately described below.

(1) For the first round, that is, the entire cloud service system is just started, after the first server is started, a $1^{st}$ request may be generated if data needs to be sent to another server. For the first server, a $1^{st}$ slot for transmitting the $1^{st}$ request is preset, and a start point of the $1^{st}$ slot is later than startup time of the system. Therefore, after obtaining the $1^{st}$ request, the first server may directly determine to enable the first switch to receive the $1^{st}$ request in the $1^{st}$ slot.

(2) For an $N^{th}$ round (N>1), after generating an $N^{th}$ request, the first server may also directly determine to enable the first switch to receive the $N^{th}$ request in an $N^{th}$ slot. It should be noted that before generating the $N^{th}$ request, the first server usually receives an $M^{th}$ response (M<N), and the $M^{th}$ response is obtained by the arbiter by processing an $M^{th}$ request (a request in an $M^{th}$ round, where the $M^{th}$ request indicates that the first server needs to send data to the second server) of the first server. The $M^{th}$ response may include information such as the $N^{th}$ slot, a data transmission path (first server→first switch→second switch→second server), and a unique identifier (which may also be referred to as a global identifier of the second server) of the second server in the entire cloud service system. Because the data transmission path starts from the first server, uses the second server as a terminal, and passes through the first switch and the second switch, the first server may determine, based on information in the $M^{th}$ request, to enable the first switch to receive, in the $N^{th}$ slot, the data that needs to be sent by the first server to the second server. This is equivalent to that the first server may determine, based on the information in the $M^{th}$ request, to enable the first switch to not only receive the $N^{th}$ request in the $N^{th}$ slot, but also receive, in the $N^{th}$ slot, the data that needs to be sent by the first server to the second server.

For ease of description, the following uses the case (2) for description. Details are not described again in the following.

It should be understood that in the case (1) or the case (2), either the $1^{st}$ request or the $N^{th}$ request may be used as the foregoing first request, and correspondingly, the $1^{st}$ slot or the $N^{th}$ slot may be used as the foregoing first slot. In the case (2), the $M^{th}$ request may be used as the foregoing second request, the $M^{th}$ response may be used as the foregoing second response, and the data that needs to be sent by the first server to the second server may be used as the foregoing first data.

It should be further understood that content indicated by the first request and the second request may be the same or different. For example, the first request may also indicate that the first server needs to send data to the second server. For another example, the first request may indicate that the first server needs to send data to a third server. For another example, the first request may not indicate any content, that is, the first request is an empty packet or the like.

It should be further understood that the first server sends the second request along a path "first server→first switch→arbiter". Similarly, the arbiter sends the second response along a path "arbiter→first switch→first server", and the same is true for the first request. For how the first server sends the second request to the first switch, refer to a subsequent process in which the first server sends the first request to the first switch. For how the arbiter sends the second response to the first switch, refer to a subsequent process in which the arbiter sends a third response to the second switch. Details are not described herein.

It should be further understood that, in this embodiment, only an example in which the length of the time domain locations used to transmit the data in one slot is the length of k/2−1 data packets is used for description. In actual application, the length of the time domain locations used to transmit the data in one slot may be greater than the length of k/2−1 data packets. For example, the length of the time domain locations used to transmit the data in one slot may alternatively be a length of k/2 data packets (correspondingly, there are k/2+1 gaps in the slot) and the like.

It should be further understood that, in this embodiment, only an example in which the first server group and the second server group are different server groups is used for description. In actual application, the first server group and the second server group may alternatively be a same server group. Correspondingly, the first server and the second server (because one server is used as a transmitting end and one server is used as a receiving end, the first server and the second server are necessarily two different servers) are the two servers in the same server group. The first switch and the second switch are also a same switch.

It should be further understood that in the $N^{th}$ round, not only the first switch receives the request of the server in the $N^{th}$ slot, but another switch (for example, the second switch) receives the request of the server in the $N^{th}$ slot. Details are not described again in the following.

502: The first server obtains a first identifier of the first server in the first server group based on the second response, and the first server obtains a second identifier of the second server in the second server group based on the second response.

After receiving the second response of the arbiter by using the first switch, the first server may parse the second response to obtain information such as the first slot, the data transmission path, and the global identifier of the second server. Therefore, the first server may determine, based on the information, to enable the first switch to not only receive the first request in the first slot, but also receive the first data (that is, the data that needs to be sent by the first server to the second server) in the first slot.

Then, the first server may obtain an intra-group identifier (that is, the first identifier of the first server in the first server group) of the first server and an intra-group identifier (that is, the second identifier of the second server in the second server group) of the second server. Still as the example shown in FIG. 8, if the server 1 connected to the TOR switch 1 determines to enable the TOR switch 1 to receive, in the slot 1, the data that needs to be sent by the server 1 to the server 2 connected to the TOR switch 2, the server 1 may first obtain the number (the number is 1) of the server 1 in the server group 1, and obtain the number (the number is 2) of the server 2 in the server group 2.

In addition, after receiving the second response, the first server may determine a time domain location at which the second response arrives at the first server. Because the second response carries a time domain location at which the second response leaves the arbiter, the first server may subtract the time domain location at which the second response leaves the arbiter from the time domain location at which the second response arrives at the first server, to obtain actual transmission duration of the second response from the arbiter to the first server. Then, the first server obtains third duration of information transmission between the first server and the arbiter, and subtracts the actual transmission duration from the third duration to obtain a clock offset. Then, the first server adjusts a local clock of the first server based on the clock offset, so that the local clock of the first server is synchronized with a local clock of the arbiter.

It should be understood that in this embodiment, for the entire cloud service system, the third duration (that is, duration required for information to travel from the first server to the arbiter) of information transmission between the first server and the arbiter is obtained in advance through testing (for example, after the cloud service system is started, the first server may randomly send a piece of information to the arbiter to test the transmission duration, where a difference between a time domain location (moment) at which the information leaves the first server and a time domain location (moment) at which the information arrives at the arbiter is the third duration). The same is true for first duration (that is, duration required for information to travel from the first server to the first switch) of information transmission between the first server and the first switch, second duration (that is, duration required for information to travel from the arbiter to the second switch) of information transmission between the arbiter and the second switch, and fourth duration (that is, duration required for information to travel from the first switch to the second switch) of information transmission between the first switch and the second switch that are mentioned subsequently. Details are not described again in the following.

503: The first server determines, in the first slot, a first time domain location corresponding to the first identifier, determines a third time domain location corresponding to the second identifier, and determines another time domain location other than the first time domain location and the third time domain location as a fifth time domain location.

After obtaining the intra-group identifier of the first server and the intra-group identifier of the second server, the first server may determine, in the k/2 gaps of the first slot, a gap corresponding to the intra-group identifier of the first server, and insert, in the gap, a time domain location used to transmit the first request, to obtain the first time domain location. Similarly, the first server may determine, in the k/2 gaps of the first slot, a gap corresponding to the intra-group identifier of the second server, and insert, in the gap, a time domain location used to transmit the response, to obtain the third time domain location. After determining the first time domain location and the third time domain location in the first slot, the first server may determine the another time domain location as the time domain location, that is, the fifth time domain location, used to transmit the first data.

In this case, the first server may divide the first slot into three parts, that is, the first time domain location, the third time domain location, and the fifth time domain location. The first time domain location is a time domain location at which the first switch receives the first request. The third time domain location is used as a reserved time domain location (that is, is used as a time domain location at which a response is subsequently received). The fifth time domain location is a time domain location at which the first switch receives the first data.

Still as the example shown in FIG. 8, it is assumed that the server 1 needs to send the request 1 to the arbiter in the $N^{th}$ round, and the slot 1 is the $N^{th}$ slot. After the server 1 determines that the number of the server 1 in the server group 1 is 1, and determines that the number of the server 2 in the server group 2 is 2, because the slot 1 has the gap 1, the gap 2, the gap 3, and the gap 4, the server 1 may insert, in the gap 1 of the slot 1, a time domain location used to transmit the request 1, and insert, in the gap 2, the time domain location used to transmit the response. The other time domain locations of the slot 1 are used as time domain locations used to transmit the data 1 that needs to be sent by the server 1 to the server 2. In this case, the server 1 may enable the TOR switch 1 to receive the request 1 and the data 1 at corresponding time domain locations in the slot 1.

504: The first server calculates a second time domain location based on the first time domain location and the first duration of information transmission between the first server and the first switch, calculates a fourth time domain location based on the third time domain location and the first duration, and calculates a sixth time domain location based on the fifth time domain location and the first duration.

Because the first time domain location, the third time domain location, and the fifth time domain location are time domain locations at which the first switch receives information, the three time domain locations need to be converted into time domain locations at which the first server sends information. Specifically, the first server may first obtain the first duration of information transmission between the first server and the first switch, subtract the first duration from the first time domain location to obtain the second time domain location, subtract the first duration from the third time domain location to obtain the fourth time domain location, and subtract the first duration from the fifth time domain location to obtain the sixth time domain location.

505: The first server sends, to the first switch at the second time domain location, the first request to be processed by the arbiter.

506: The first server remains silent at the fourth time domain location.

507: The first server sends the first data to the first switch at the sixth time domain location.

After obtaining the second time domain location, the fourth time domain location, and the sixth time domain location, the first server may send the first request to the first switch at the second time domain location, so that the first switch can receive the first request at the first time domain location. The first server may further remain silent (that is, does not send any information) at the fourth time domain location, so that the first switch may receive no information at the third time domain location. The first server may further send the first data to the first switch at the sixth time domain location, so that the first switch can receive the first data at the fifth time domain location.

508: The first switch sends the first request to the arbiter, and sends the first data to the second switch.

After receiving the first request at the first time domain location, the first switch may forward the first request to the arbiter for processing. After the first switch receives the first data at the fifth time domain location, because the first data carries information (that is, a global identifier of each hop on the data transmission path) such as the global identifier of the first server, a number (determined based on the data transmission path) of an output port of the first switch, a number of an output port of the second switch, and the global identifier of the second server, the first switch may determine, based on the information, that the first data is the data that needs to be sent by the first server to the second server. Therefore, the first switch may first send the first data to the second switch, so that the second switch sends the first data to the second server, thereby completing data transmission.

Figure 10:
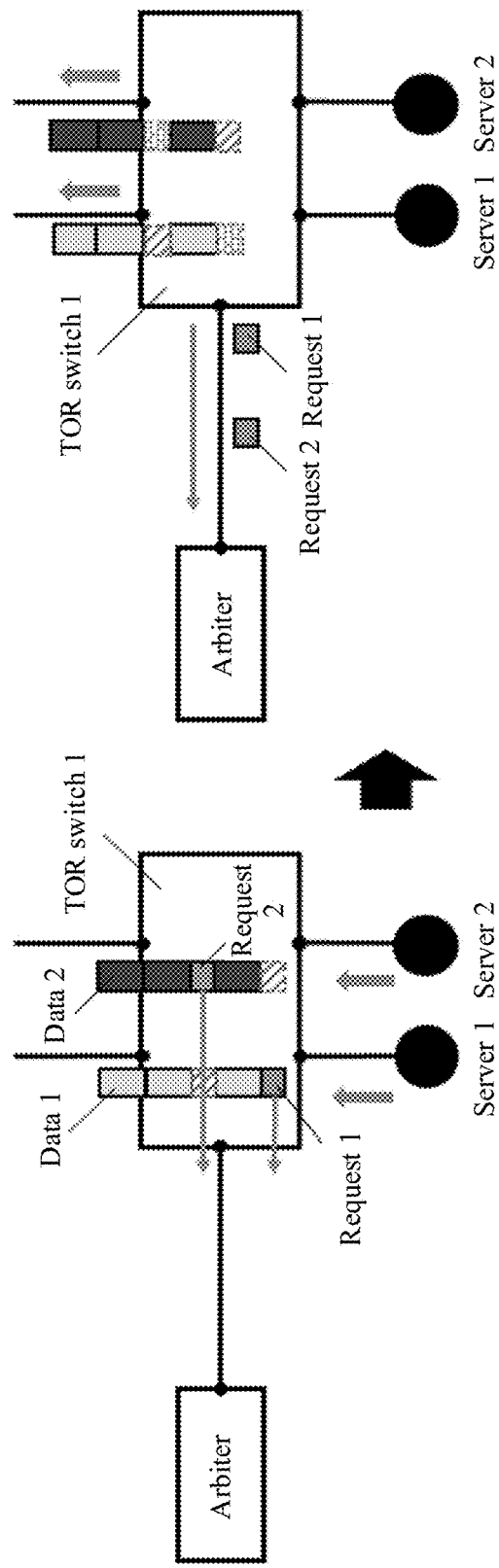
FIG. 10 is a schematic diagram of another structure of a cloud service system according to an embodiment of this present disclosure.

Different intra-group identifiers correspond to different time domain locations in the first slot. If another server in the first server group other than the first server needs to send a request to the arbiter, the first server and the another server do not enable the first switch to receive a plurality of requests at a same time domain location because intra-group identifiers of different servers in a same group are necessarily different, so that a case in which the requests collide can be effectively avoided. For example, as shown in FIG. 10 (FIG. 10 is another schematic diagram of a structure of a cloud service system according to an embodiment of this disclosure), it is assumed that in the $N^{th}$ round, the server 2 connected to the TOR switch 1 also needs to send a request 2 to the arbiter. In this case, the server 2 connected to the TOR switch 1 may also enable the TOR switch 1 to receive the request 2 in the slot 1. Because the intra-group identifiers of the server 1 and the server 2 that are connected to the TOR switch 1 are different, the time domain location at which the TOR switch 1 receives the request 1 in the slot 1 and a time domain location at which the TOR switch 1 receives the request 2 in the slot 1 are also different. Therefore, the request 1 and the request 2 do not conflict.

509: The arbiter receives a third request from the second switch, processes the third request, and obtains the third response, where the third request is generated by the second server.

510: The arbiter calculates, based on a time domain location at which the third response is obtained and the second duration of information transmission between the arbiter and the second switch, a second slot in which a time domain location at which the third response arrives at the second switch is located.

511: The arbiter obtains, in the second slot, a seventh time domain location corresponding to the second identifier of the second server in the second server group.

After the arbiter processes the second request and obtains the second response, because the second response includes information such as the first slot and the data transmission path (first server→first switch→second switch→second server), the arbiter may determine, based on the information, that the first switch receives the first data from the first server in the first slot. The arbiter may obtain the fourth duration of information transmission between the first switch and the second switch, and add the fourth duration to the first slot to obtain the second slot. Then, the arbiter may determine that the second switch receives the first data from the first switch in the second slot.

It can be learned that the second slot and the first slot are two corresponding slots. Therefore, distribution of time domain locations in the second slot is the same as distribution of time domain locations in the first slot. Specifically, after determining the second slot, the arbiter may determine, in the second slot, the ninth time domain location corresponding to the intra-group identifier of the first server and the seventh time domain location corresponding to the intra-group identifier of the second server. Another time domain location other than the seventh time domain location and the ninth time domain location is determined as an eighth time domain location. It should be noted that, for a process in which the arbiter determines, in the second slot, the seventh time domain location, the eighth time domain location, and the ninth time domain location, refer to the related description part of determining the first time domain location, the third time domain location, and the fifth time domain location by the first server in the first slot. Details are not described herein again.

In this case, the arbiter may divide the second slot into three parts, that is, the seventh time domain location, the eighth time domain location, and the ninth time domain location. The seventh time domain location is a time domain location (corresponding to the third time domain location of the first slot) at which the second switch receives the response. The eighth time domain location is a time domain location (corresponding to the fifth time domain location of the first slot) at which the second switch receives the first data. The ninth time domain location is used as a reserved time domain location (corresponding to the first time domain location of the first slot).

In a process in which the first switch sends the first data to the second switch, the second server may send the third request to the arbiter by using the second switch, and the arbiter obtains the third response after processing the third request. Then, the arbiter may obtain the second duration of information transmission between the arbiter and the second switch, add the second duration to the time domain location at which the third response is obtained, and estimate the time domain location at which the third response arrives at the second switch. Then, the arbiter may detect a slot in which the time domain location at which the third response arrives at the second switch is located. If the time domain location is in the second slot, the arbiter may determine the seventh time domain location in the second slot as the time domain location at which the second switch receives the third response.

It should be understood that the third request is usually a request in a Kth round (K≠N).

It should be further understood that the third request may indicate a plurality of types of content. For example, the third request may indicate that the second server needs to send data to the third server. For another example, the third request may not indicate any content, that is, the third request is an empty packet. Further, content indicated by the third response corresponds to the content indicated by the third request. Details are not described herein. The third server and the first server may be a same server, or may be different servers. This is not limited herein.

It should be further understood that the second server sends the third request along a path "second server→second switch→arbiter". For how the second server sends the third request to the second switch, refer to the foregoing process in which the first server sends the first request to the first switch. Details are not described herein again.

512: The arbiter calculates a tenth time domain location based on the seventh time domain location and the second duration.

After the arbiter determines that the seventh time domain location in the second slot is the time domain location at which the second switch receives the third response, because the seventh time domain location is a time domain location at which the second switch receives information, the time domain location needs to be converted into a time domain location at which the arbiter sends the information. Specifically, the arbiter may subtract the second duration from the seventh time domain location to obtain the tenth time domain location.

513: The arbiter sends the third response to the second switch at the tenth time domain location.

After determining the tenth time domain location, the arbiter may send the third response to the second switch at the tenth time domain location, so that the second switch receives the third response at the seventh time domain location in the second slot. It should be noted that the second switch may further receive the first data at the eighth time domain location in the second slot.

514: The second switch sends the first data to the second server, and sends the third response to the second server.

After receiving the third response at the seventh time domain location in the second slot, the second switch may send the third response to the second server. It should be noted that, after receiving the first data at the eighth time domain location in the second slot, the second switch may also send the first data to the second server. In this case, data transmission between the first server and the second server is completed.

Figure 11:
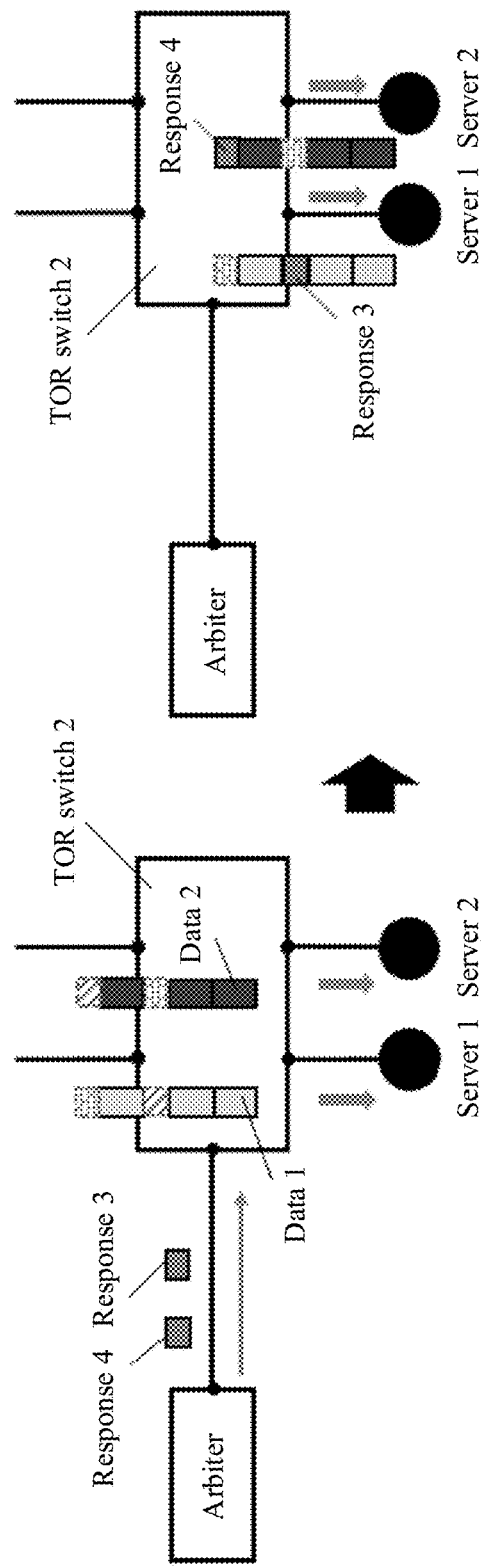
FIG. 11 is a schematic diagram of another structure of a cloud service system according to an embodiment of this present disclosure.

In the second slot, the seventh time domain location is the time domain location at which the second switch receives the third response from the arbiter, and the eighth time domain location is the time domain location at which the second switch receives the first data from the first switch. The seventh time domain location and the eighth time domain location are completely different time domain locations. It can be learned that the arbiter does not enable the second switch to receive the data and the response at a same time domain location. A case in which the data and the response collide can be effectively avoided. For example, as shown in FIG. 11 (FIG. 11 is another schematic diagram of a structure of a cloud service system according to an embodiment of this disclosure), it is assumed that the TOR switch 2 receives, in the slot 2 (corresponding to the foregoing slot 1), the response 3 from the arbiter, and the data 1 that needs to be sent by the server 1 connected to the TOR switch 1 to the server 2 connected to the TOR switch 2. Under control of the arbiter, the time domain location at which the TOR switch 2 receives the response 3 in the slot 2 and the time domain location at which the TOR switch 2 receives the data 1 in the slot 2 are different. Therefore, the response 3 and the data 1 do not conflict.

In addition, if the second server does not receive the first data, in other words, the second switch does not send the first data to the second server, that is, the second switch does not receive the first data at the seventh time domain location in the second slot, it indicates that a transmission path between the first switch and the second switch is faulty. In this case, the second server may send a fourth request (indicating that the second server does not receive the first data) to the arbiter by using the second switch in a subsequent process, so that the arbiter determines, based on the fourth request, that the transmission path between the first switch and the second switch is faulty, and performs subsequent path fault troubleshooting (for example, disables the path until the fault is cleared).

Further, if the arbiter does not receive, within preset duration (that is, within a preset time period), a request generated by the second server, the arbiter may directly determine that the transmission path between the second server and the arbiter is faulty, and perform subsequent path fault troubleshooting.

It should be understood that the fourth request is usually a request in a $P^{th}$ round (P>K).

It should be further understood that the second server sends the fourth request along the path "second server→second switch→arbiter". For how the second server sends the fourth request to the second switch, refer to the foregoing process in which the first server sends the first request to the first switch. Details are not described herein again.

In embodiments of this disclosure, the cloud service system includes the arbiter, the first switch, and the first server group. The arbiter is connected to the first server group by using the first switch. Different servers in the first server group have different identifiers. When the first server needs to send the first request to the arbiter by using the first switch, the first server may first obtain the first identifier of the first server in the first server group. Then, the first server determines, in the first slot, the first time domain location corresponding to the first identifier, where the first time domain location is the time domain location at which the first switch receives the first request. Finally, the first server sends the first request to the first switch, so that the first switch receives the first request at the first time domain location, and sends the first request to the arbiter. In the foregoing process, in the first server group, if the another server other than the first server also needs to send the request to the arbiter by using the first switch, the first server and the another server do not enable the first switch to receive the plurality of requests at the same time domain location in the first slot because identifiers of different servers in the first server group are necessarily different and different identifiers correspond to different time domain locations in the first slot. The case in which the requests collide can be effectively avoided. This may not cause losses of the requests, and can help improve stability of data transmission between the servers.

Further, the cloud service system further includes the arbiter, the second switch, and the second server group. The arbiter is connected to the second server group by using the second switch, and different servers in the second server group have different identifiers. After the second server sends the third request to the arbiter by using the second switch, the arbiter may process the third request to obtain the third response. Then, the arbiter determines the seventh time domain location (corresponding to the second identifier of the second server in the second server group) in the second slot, and enables the second switch to receive the third response at the seventh time domain location. The second slot further includes the eighth time domain location, and the second switch receives the first data (the data sent by the first server to the second server) at the eighth time domain location. Because the seventh time domain location and the eighth time domain location are completely different time domain locations, the second switch does not receive the data and the response at a same time domain location in the second slot. A case in which the data collides with the response can be effectively avoided. This may not cause a loss of the response, and can help improve the stability of the data transmission between the servers.

Further, in the cloud service system according to this embodiment of this disclosure, all switches are zero-buffer switches. Establishing a network based on the zero-buffer switches can effectively reduce complexity of switch hardware, and reduce power consumption, and operation and maintenance costs. More importantly, end-to-end delays (for example, the foregoing first duration, second duration, third duration, and fourth duration) of traffic can be accurately determined in advance.

Further, for any server, the server may synchronize a local clock of the server with the local clock of the arbiter. This helps ensure global clock synchronization of the entire cloud service system.

Further, the arbiter may further detect whether a transmission path between the switches and a transmission path between the arbiter and the server are faulty, and perform path fault troubleshooting on the faulty transmission path, thereby providing assurance for the entire network.

Figure 12:
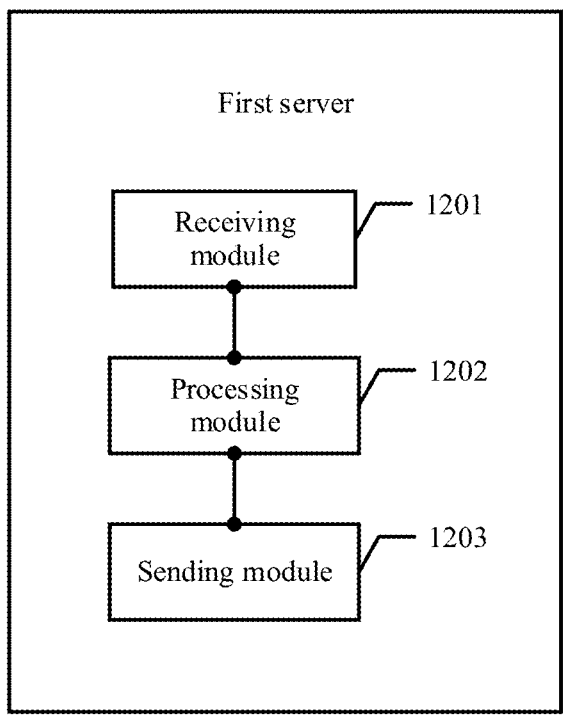
FIG. 12 is a schematic diagram of a structure of a server according to an embodiment of this present disclosure.

The foregoing is detailed descriptions of the information transmission method according to embodiments of this disclosure. The following describes a server and an arbiter according to embodiments of this disclosure. FIG. 12 is a schematic diagram of a structure of a server according to an embodiment of this disclosure. The server is used as a first server, and the first server is disposed in a cloud service system (refer to the cloud service system shown in FIG. 4). The cloud service system includes an arbiter, a first switch, and a first server group. The arbiter is connected to the first server group by using the first switch. Different servers in the first server group have different identifiers. As shown in FIG. 12, the first server includes:

a processing module 1202, configured to obtain a first identifier of the first server in the first server group, where the processing module 1202 is further configured to determine, in a first slot, a first time domain location corresponding to the first identifier, the first time domain location is a time domain location at which the first switch receives a first request to be processed by the arbiter, and different identifiers correspond to different time domain locations in the first slot; and a sending module 1203, configured to send the first request to the first switch based on the first time domain location.

In a possible implementation, the processing module 1202 is configured to calculate a second time domain location based on the first time domain location and first duration of information transmission between the first server and the first switch. The sending module 1203 is configured to send the first request to the first switch at the second time domain location.

In a possible implementation, the first server further includes a receiving module 1201, configured to receive receives a second response from the first switch. The second response is obtained by the arbiter by processing a second request, the second request indicates that the first server needs to send first data to the second server, and the second response indicates the first switch to receive the first data in the first slot. The processing module 1202 is configured to obtain the first identifier of the first server in the first server group based on the second response.

In a possible implementation, the cloud service system further includes a second switch and a second server group, and the first switch is connected to the second switch. The processing module 1202 is further configured to: obtain a second identifier of the second server in the second server group based on the second response, determine, in the first slot, a third time domain location corresponding to the second identifier, and calculate a fourth time domain location based on the third time domain location and the first duration. The sending module 1203 is further configured to remain silent at the fourth time domain location.

In a possible implementation, the processing module 1202 is further configured to: determine, in the first slot, another time domain location other than the first time domain location and the third time domain location as a fifth time domain location, and calculate a sixth time domain location based on the fifth time domain location and the first duration. The sending module 1203 is further configured to send the first data to the first switch at the sixth time domain location.

In a possible implementation, if the first identifier and the second identifier are the same, the first time domain location and the third time domain location are a same time domain location.

In a possible implementation, the first identifier is a first number of the first server in the first server group, and the second identifier is a second number of the second server in the second server group.

Figure 13:
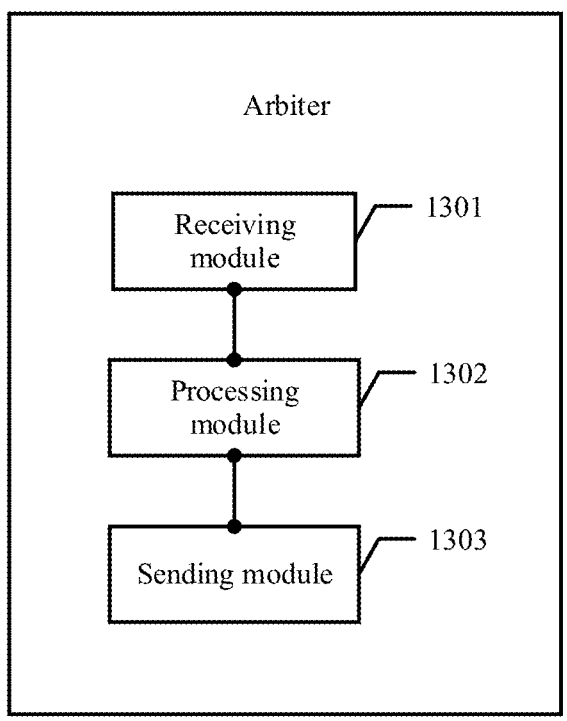
FIG. 13 is a schematic diagram of a structure of an arbiter according to an embodiment of this present disclosure.

FIG. 13 is a schematic diagram of a structure of an arbiter according to an embodiment of this disclosure. The arbiter is disposed in a cloud service system (refer to the cloud service system shown in FIG. 4). The cloud service system further includes a second switch and a second server group. The arbiter is connected to the second server group by using the second switch. Different servers in the second server group have different identifiers. As shown in FIG. 13, the arbiter includes:

a receiving module 1301, configured to receive a third request from the second switch, where the third request is generated by a second server;

a processing module 1302, configured to process the third request to obtain a third response, where the processing module 1302 is further configured to obtain, in a second slot, a seventh time domain location corresponding to a second identifier of the second server in the second server group, the seventh time domain location is a time domain location at which the second switch receives the third response, and different identifiers correspond to different time domain locations in the second slot; and a sending module 1303, configured to send the third response to the second switch based on the seventh time domain location.

In a possible implementation, the second slot further includes an eighth time domain location different from the seventh time domain location, the eighth time domain location is a time domain location at which the second switch receives first data, and the first data is data to be sent to the second server.

In a possible implementation, the cloud service system further includes a first switch and a first server group, the first switch is connected to the second switch, and the arbiter is connected to the first server group by using the first switch. The first data is data that needs to be sent by the first server to the second server, the second slot further includes a ninth time domain location, the ninth time domain location corresponds to a first identifier of the first server in the first server group, and the eighth time domain location is another time domain location in the second slot other than the seventh time domain location and the ninth time domain location.

In a possible implementation, the processing module 1302 is configured to calculate a tenth time domain location based on the seventh time domain location and second duration of information transmission between the arbiter and the second switch. The sending module 1303 is configured to send the third response to the second switch at the tenth time domain location.

In a possible implementation, the processing module 1302 is further configured to calculate, based on the time domain location at which the third response is obtained and the second duration, the second slot in which the time domain location at which the third response arrives at the second switch is located.

In a possible implementation, if the first identifier and the second identifier are the same, the seventh time domain location and the tenth time domain location are a same time domain location.

In a possible implementation, the first identifier is a first number of the first server in the first server group, and the second identifier is a second number of the second server in the second server group.

It should be noted that content such as information exchange between the modules/units of the apparatus and the execution processes thereof is based on a same concept as that of the method embodiments of this disclosure, and produces same technical effects as that of the method embodiments of this disclosure. For specific content, refer to the foregoing descriptions in the method embodiments of this disclosure. Details are not described herein again.

Figure 14:
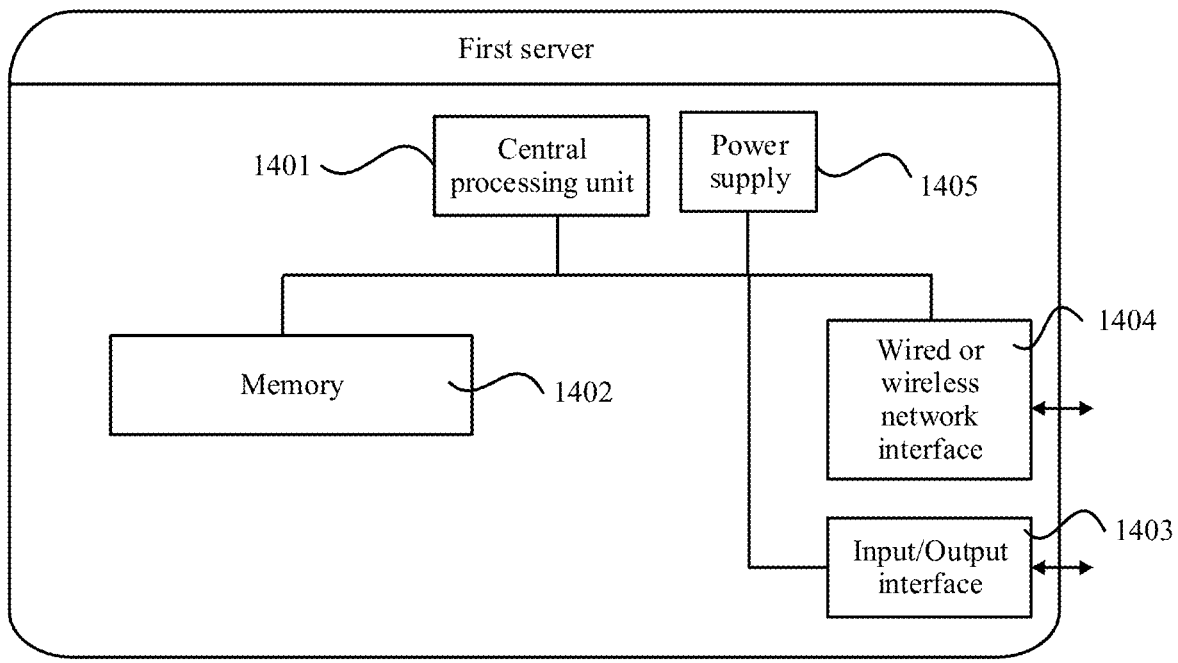
FIG. 14 is a schematic diagram of another structure of a server according to an embodiment of this present disclosure.

FIG. 14 is a schematic diagram of another structure of a server according to an embodiment of this disclosure. As shown in FIG. 14, the server in this embodiment of this disclosure may be used as a first server. An embodiment of the first server may include one or more central processing units 1401, a memory 1402, an input/output interface 1403, a wired or wireless network interface 1404, and a power supply 1405.

The memory 1402 may be used for transitory storage or persistent storage. Further, the central processing unit 1401 may be configured to: communicate with the memory 1402, and execute, on the first server, a series of instruction operations in the memory 1402.

In this embodiment, the central processing unit 1401 may perform operations performed by the first server in the embodiment shown in FIG. 5A to FIG. 5C. Details are not described herein again.

In this embodiment, division of specific function modules in the central processing unit 1401 may be similar to division of modules such as the receiving module, the processing module, and the sending module described in FIG. 12. Details are not described herein again.

Figure 15:
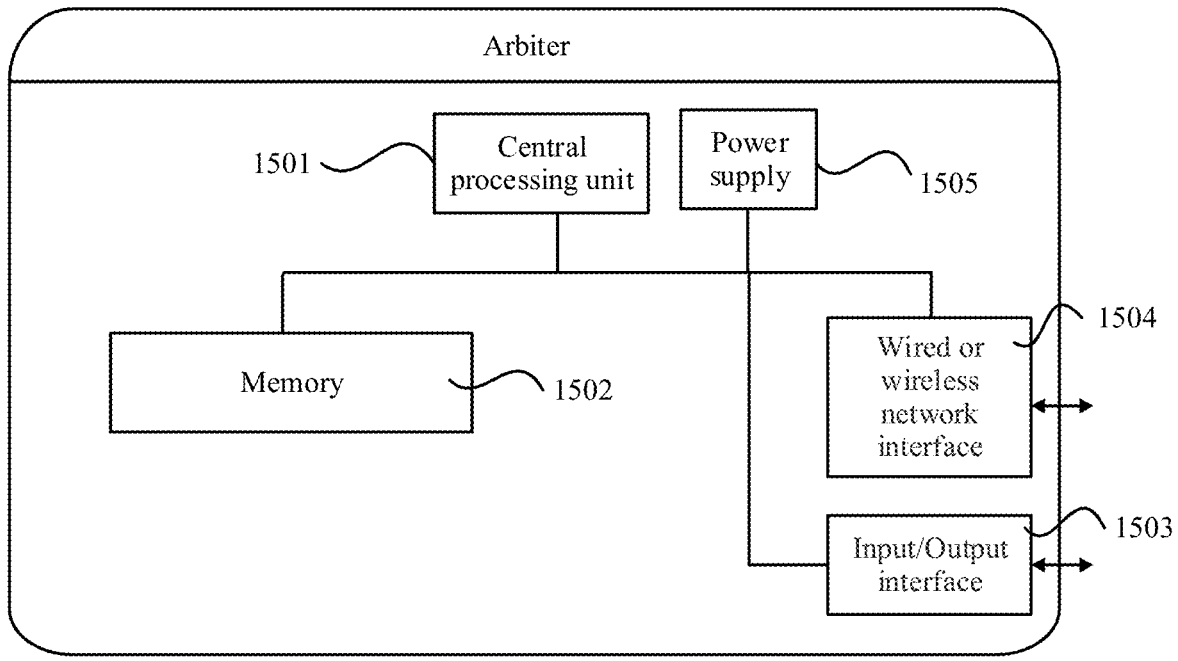
FIG. 15 is a schematic diagram of another structure of an arbiter according to an embodiment of this present disclosure.

FIG. 15 is a schematic diagram of another structure of an arbiter according to an embodiment of this disclosure. As shown in FIG. 15, an embodiment of the arbiter may include one or more central processing units 1501, a memory 1502, an input/output interface 1503, a wired or wireless network interface 1504, and a power supply 1505.

The memory 1502 may be used for transitory storage or persistent storage. Further, the central processing unit 1501 may be configured to: communicate with the memory 1502, and execute, on the arbiter, a series of instruction operations in the memory 1502.

In this embodiment, the central processing unit 1501 may perform operations performed by the arbiter in the embodiment shown in FIG. 5A to FIG. 5C. Details are not described herein again.

In this embodiment, division of specific function modules in the central processing unit 1501 may be similar to division of modules such as the receiving module, the processing module, and the sending module described in FIG. 13. Details are not described herein again.

An embodiment of this disclosure further relates to a computer storage medium, including computer-readable instructions. When the computer-readable instructions are executed, the steps performed by the first server in the embodiment shown in FIG. 5A to FIG. 5C or the steps performed by the arbiter in the embodiment shown in FIG. 5A to FIG. 5C are implemented.

An embodiment of this disclosure further relates to a computer program product, including instructions. When the computer program product runs on a computer, the computer is enabled to perform the steps performed by the first server in the embodiment shown in FIG. 5A to FIG. 5C, or implement the steps performed by the arbiter in the embodiment shown in FIG. 5A to FIG. 5C.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this disclosure, it should be understood that the disclosed systems, apparatuses, and methods may be implemented in other manners. For example, the described apparatus embodiments are merely examples. For example, division into units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on an actual requirement to achieve the objectives of the solutions of embodiments.

In addition, functional units in embodiments of this disclosure may be integrated into one processing unit, or each of the units may exist alone physically, or two or more units may be integrated into one unit. The integrated unit may be implemented in a form of hardware, or may be implemented in a form of a software function unit.

When the integrated unit is implemented in the form of the software functional unit and is sold or used as an independent product, the integrated unit may be stored in a computer-readable storage medium. Based on such an understanding, the technical solutions of embodiments of this disclosure essentially, or the part contributing to the conventional technology, all or some of the technical solutions may be implemented in a form of a software product. The computer software product is stored in a storage medium, and includes several instructions for instructing a computer device (which may be a personal computer, a server, a network device, or the like) to perform all or some of the steps of the methods described in embodiments of this disclosure. The storage medium includes any medium that can store program code, such as a USB flash drive, a removable hard disk, a read-only memory (ROM), a random access memory (RAM), a magnetic disk, or an optical disc.

What is claimed is:

1. An information transmission method, wherein the method is applied to a first server in a first server group, an arbiter is connected to the first server group by a first switch, and the method comprises:
    obtaining, by the first server, a first identifier of the first server in the first server group;
    determining, by the first server in a first slot, a first time domain location corresponding to the first identifier, wherein the first time domain location is a time domain location at which the first switch receives a first request to be processed by the arbiter, and different identifiers correspond to different time domain locations in the first slot; and
    sending, by the first server, the first request to the first switch based on the first time domain location.

2. The method according to claim 1, wherein sending the first request to the first switch based on the first time domain location comprises:
    determining, by the first server, a second time domain location based on the first time domain location and first duration of information transmission between the first server and the first switch; and
    sending, by the first server, the first request to the first switch at the second time domain location.

3. The method according to claim 2, wherein before obtaining the first identifier of the first server in the first server group, the method further comprises:

receiving, by the first server, a second response from the first switch, wherein the second response is obtained by the arbiter by processing a second request, the second request indicates that the first server needs to send first data to the second server, and the second response indicates the first switch to receive the first data in the first slot; and wherein the obtaining the first identifier of the first server in the first server group comprises:

obtaining, by the first server, the first identifier of the first server in the first server group based on the second response.

4. The method according to claim 3, wherein the first switch is connected to the second switch, the arbiter is connected to a second server group by a second switch, and after receiving, by the first server, the second response from the first switch, the method further comprises:

obtaining, by the first server, a second identifier of the second server in the second server group based on the second response;

determining, by the first server in the first slot, a third time domain location corresponding to the second identifier;

determining, by the first server, a fourth time domain location based on the third time domain location and the first duration; and remaining silent, by the first server, at the fourth time domain location.

5. The method according to claim 4, wherein after receiving the second response from the first switch, the method further comprises:

determining, by the first server in the first slot, another time domain location other than the first time domain location and the third time domain location as a fifth time domain location;

determining, by the first server, a sixth time domain location based on the fifth time domain location and the first duration; and sending, by the first server, the first data to the first switch at the sixth time domain location.

6. The method according to claim 5, wherein based on the first identifier and the second identifier being the same, the first time domain location and the third time domain location are a same time domain location.

7. The method according to claim 4, wherein the first identifier is a first number of the first server in the first server group, and the second identifier is a second number of the second server in the second server group.

8. An information transmission device, used as a first server in a first server group, wherein an arbiter is connected to the first server group by a first switch, the information transmission device comprises a memory storing instructions, and a processor; upon the instructions being executed by the processor, the information transmission device is caused to perform operations comprising:

obtaining a first identifier of the first server in the first server group;

determining a first time domain location corresponding to the first identifier, wherein the first time domain location is a time domain location at which the first switch receives a first request to be processed by the arbiter, and different identifiers correspond to different time domain locations in the first slot; and sending the first request to the first switch based on the first time domain location.

9. The information transmission device according to claim 8, wherein the operation of sending the first request to the first switch based on the first time domain location comprises:

determining a second time domain location based on the first time domain location and first duration of information transmission between the first server and the first switch; and sending the first request to the first switch at the second time domain location.

10. The information transmission device according to claim 9, wherein before obtaining the first identifier of the first server in the first server group, the information transmission device is caused to further perform operations comprising:

receiving a second response from the first switch, wherein the second response is obtained by the arbiter by processing a second request, the second request indicates that the first server needs to send first data to the second server, and the second response indicates the first switch to receive the first data in the first slot; and wherein the operation of obtaining the first identifier of the first server in the first server group comprises:

obtaining the first identifier of the first server in the first server group based on the second response.

11. The information transmission device according to claim 10, wherein the first switch is connected to a second switch, the arbiter is connected to a second server group by the second switch, and after receiving the second response from the first switch, the information transmission device is caused to further perform operations comprising:

obtaining a second identifier of the second server in the second server group based on the second response;

determining, in the first slot, a third time domain location corresponding to the second identifier;

determining a fourth time domain location based on the third time domain location and the first duration; and remaining silent at the fourth time domain location.

12. The information transmission device according to claim 11, wherein after receiving the second response from the first switch, the information transmission device is caused to further perform operations comprising:

determining, in the first slot, another time domain location other than the first time domain location and the third time domain location as a fifth time domain location;

determining, a sixth time domain location based on the fifth time domain location and the first duration; and sending, the first data to the first switch at the sixth time domain location.

13. The information transmission device according to claim 12, wherein based on the first identifier and the second identifier being the same, the first time domain location and the third time domain location are a same time domain location.

14. The information transmission device according to claim 11, wherein the first identifier is a first number of the first server in the first server group, and the second identifier is a second number of the second server in the second server group.

15. A non-transitory computer-readable storage medium, storing one or more instructions, and wherein upon execution by a first server in a first server group to which an arbiter is connected by a first switch, the first server is caused to perform operations comprising:

obtaining a first identifier of the first server in the first server group;

determining a first time domain location corresponding to the first identifier, wherein the first time domain location is a time domain location at which the first switch receives a first request to be processed by the arbiter, and different identifiers correspond to different time domain locations in the first slot; and sending the first request to the first switch based on the first time domain location.

16. The non-transitory computer-readable storage medium according to claim 15, wherein the operation of sending the first request to the first switch based on the first time domain location comprises:

determining a second time domain location based on the first time domain location and first duration of information transmission between the first server and the first switch; and sending the first request to the first switch at the second time domain location.

17. The non-transitory computer-readable storage medium according to claim 16, wherein before obtaining the first identifier of the first server in the first server group, the first server is caused to further perform operations comprising:

receiving a second response from the first switch, wherein the second response is obtained by the arbiter by processing a second request, the second request indicates that the first server needs to send first data to the second server, and the second response indicates the first switch to receive the first data in the first slot; and wherein the operation of obtaining the first identifier of the first server in the first server group comprises:

obtaining the first identifier of the first server in the first server group based on the second response.

18. The non-transitory computer-readable storage medium according to claim 17, wherein the first switch is connected to a second switch, the arbiter is connected to a second server group by the second switch, and after the receiving, by the first server, a second response from the first switch, the first server is caused to further perform operations comprising:

obtaining a second identifier of the second server in the second server group based on the second response;

determining, in the first slot, a third time domain location corresponding to the second identifier;

determining, a fourth time domain location based on the third time domain location and the first duration; and remaining silent at the fourth time domain location.

19. The non-transitory computer-readable storage medium according to claim 18, wherein after receiving the second response from the first switch, the first server is caused to further perform operations comprising:

determining, in the first slot, another time domain location other than the first time domain location and the third time domain location as a fifth time domain location;

determining, a sixth time domain location based on the fifth time domain location and the first duration; and sending, the first data to the first switch at the sixth time domain location.

20. The non-transitory computer-readable storage medium according to claim 19, wherein based on the first identifier and the second identifier being the same, the first time domain location and the third time domain location are a same time domain location.

* * * * *